United States Patent
Yousaf et al.

(10) Patent No.: US 11,580,680 B2
(45) Date of Patent: *Feb. 14, 2023

(54) SYSTEMS AND INTERACTIVE USER INTERFACES FOR DYNAMIC RETRIEVAL, ANALYSIS, AND TRIAGE OF DATA ITEMS

(71) Applicant: Palantir Technologies Inc., Palo Alto, CA (US)

(72) Inventors: Timothy Yousaf, New York, NY (US); Drew Dennison, Palo Alto, CA (US); Paul Thoren, Arlington, VA (US); Khoa Pham, New York, NY (US); Eliot Ball, West Yorkshire (GB); Spencer Tank, Brooklyn, NY (US); John McRaven, Palo Alto, CA (US); Lucas Ray, Palo Alto, CA (US); Jeffrey Tsui, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,283

(22) Filed: Dec. 13, 2019

(65) Prior Publication Data

US 2020/0118311 A1 Apr. 16, 2020

Related U.S. Application Data

(63) Continuation of application No. 14/859,882, filed on Sep. 21, 2015, now Pat. No. 10,552,994.
(Continued)

(51) Int. Cl.
*G06F 3/0481* (2022.01)
*G06F 16/33* (2019.01)
(Continued)

(52) U.S. Cl.
CPC .......... *G06T 11/206* (2013.01); *G06F 3/0481* (2013.01); *G06F 16/334* (2019.01);
(Continued)

(58) Field of Classification Search
CPC ...... G06T 11/206; G06F 21/552; G06F 21/50; G06F 16/3328; G06F 16/338;
(Continued)

(56) References Cited

U.S. PATENT DOCUMENTS 9,069,862 B1 * 6/2015 Perkowitz ............. G06F 16/248
9,684,741 B2 * 6/2017 Li ....................... G06F 16/9038
(Continued)

FOREIGN PATENT DOCUMENTS

EP 3537325 9/2019

OTHER PUBLICATIONS

U.S. Pat. No. 10,552,994, Systems and Interactive User Interfaces for Dynamic Retrieval, Analysis, and Triage of Data Items, Issued Feb. 4, 2020.

*Primary Examiner* — Kieu D Vu
*Assistant Examiner* — Blaine T Basom
(74) *Attorney, Agent, or Firm* — Knobbe Martens Olson & Bear LLP

(57) ABSTRACT

Embodiments of the present disclosure relate to a data analysis system that may receive data comprising a plurality of raw data items from one or more data sources, such as a monitoring agent located in a monitored network. The received data may be scored using one or more scoring rules and/or algorithms, with raw data items satisfying a score threshold designated as "data item leads." Raw data items associated with a data item lead may be searched and displayed to the user via an interactive user interface. The data analysis system may be used to execute searches and additional enrichments against the received raw data items.

(Continued)

The data analysis system may group received raw data items based upon shared attribute values. The data analysis system may be used to categorize received data and construct timelines, histograms, and/or other visualizations based upon the various attributes of the raw data items.

20 Claims, 18 Drawing Sheets

Related U.S. Application Data

(60) Provisional application No. 62/095,662, filed on Dec. 22, 2014.

(51) Int. Cl.
   *G06F 16/332* (2019.01)
   *G06F 16/338* (2019.01)
   *G06T 11/20* (2006.01)
   *G06F 21/55* (2013.01)
   *G06F 21/50* (2013.01)

(52) U.S. Cl.
   CPC ........ *G06F 16/338* (2019.01); *G06F 16/3328* (2019.01); *G06F 21/50* (2013.01); *G06F 21/552* (2013.01)

(58) Field of Classification Search
   CPC ...... G06F 16/334; G06F 3/0481; G06F 40/18; G06F 40/177; G06F 16/21; G06F 16/2477; G06F 16/447; G06F 16/45; G06F 16/285; G06F 16/287; G06F 16/34; G06F 16/345; G06F 16/35; G06F 16/353; G06F 16/355; G06F 16/358; G06F 16/435; G06F 16/438; G06F 16/44; G06F 16/489; G06F 16/532; G06F 16/535; G06F 16/538; G06F 16/54; G06F 16/55; G06F 16/58; H04L 43/045; H04N 1/00432

See application file for complete search history.

(56) References Cited

U.S. PATENT DOCUMENTS

| | | | |
|---|---|---|---|
| 10,552,994 B2 | 2/2020 | Yousaf et al. | |
| 2005/0027694 A1* | 2/2005 | Sauermann | G06F 16/248 |
| 2005/0080795 A1* | 4/2005 | Kapur | G06F 16/35 |
| 2008/0189408 A1* | 8/2008 | Cancel | G06Q 10/04 |
| | | | 709/224 |
| 2008/0270391 A1* | 10/2008 | Newbold | G06F 16/9535 |
| 2011/0161182 A1* | 6/2011 | Racco | G06Q 30/0277 |
| | | | 705/26.1 |
| 2011/0202500 A1* | 8/2011 | Warn | G06F 21/6218 |
| | | | 707/607 |
| 2013/0036132 A1* | 2/2013 | Molander | G06F 16/248 |
| | | | 707/769 |
| 2014/0317104 A1* | 10/2014 | Isaacs | G06F 16/332 |
| | | | 707/728 |
| 2015/0350269 A1* | 12/2015 | Shibata | H04L 65/403 |
| | | | 715/202 |
| 2016/0098485 A1* | 4/2016 | Burke | G06F 16/242 |
| | | | 707/706 |

* cited by examiner

FIG. 3C

ENRICHMENTS

SAVED ENRICHMENTS ← 420

These saved enrichments are available based on your current search results.

[SOURCE ADDRESS TIME SEARCH AROUND ▸] ← 422  [USER · COMPUTER SEARCH ▸]  [USER SEARCH ▸]

BASE REALM  ✕

DESCRIPTION
Searches BaseRealm for the specified column.

INPUTS

| Input Table ▸ | Proxy.Proxy | | Coloumn ▸ | ACTION |
| Object ▸ | xxxcall | | Property ▸ | xxxxxx |

OUTPUTS

[Output Table]

[ADD ▸] [SAVE]

DATA TYPES ← 426

Proxy.Proxy
ACTION
ACTIONFLAGS
APPLICATION
BYTES
BYTES_RECEIVED
BYTES_SENT
CATEGORY
CPADDING
DESTINATIONADDRESS
DESTINATION_COUNTRY
DESTINATION_PORT
DESTINATION_USER
DESTINATION_ZONE
DOMAIN
ELAPSED_TIME_SEC
FLAGS

FIG. 4D

SYSTEMS AND INTERACTIVE USER INTERFACES FOR DYNAMIC RETRIEVAL, ANALYSIS, AND TRIAGE OF DATA ITEMS

CROSS-REFERENCE TO RELATED APPLICATIONS

This application is a continuation of U.S. patent application Ser. No. 14/859,882, filed on Sep. 21, 2015, which application claims the benefit of U.S. Provisional Application No. 62/095,662, filed on Dec. 22, 2014. All of the above-listed applications are hereby incorporated by reference in their entireties.

In addition, any and all applications for which a foreign or domestic priority claim is identified in the Application Data Sheet as filed with the present application are hereby incorporated by reference under 37 CFR 1.57.

BACKGROUND

Embodiments of the present disclosure generally related to analysis and triage of data items, and specifically to analysis and triage of suspected malware-related data items.

Detection of the presence of malware and/or other malicious activity occurring on a network is a highly important, but oftentimes challenging task. Detection of malware and malicious activity is of particular importance to organizations (for example, businesses) that maintain internal networks of computing devices that may be connected to various external networks of computing devices (for example, the Internet) because infection of a single computing device of the internal network may quickly spread to other computing devices of the internal network and may result in significant data loss and/or financial consequences.

Detection of the presence of malware and/or malicious activity on a monitored network may be performed through the examination of activity occurring on a monitored network over time. Previously, determination and identification of malware or malicious activity through the examination of network activity was a labor intensive task. For example, an analyst may have had to pore through numerous tracking logs and other information of the monitored network, manually discern patterns and perform analyses to gain additional context, and compile any information gleaned from such analyses.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure facilitate and streamline the process of retrieving and enriching data for analysis and triage. For example, the data analysis system may enable an analyst to more efficiently search for and view relevant data items, and to enrich viewed data items with additional contextual information.

Embodiments of the present disclosure relate to a data analysis system (also referred to herein as "the system") that may receive data comprising a plurality of raw data items from one or more data sources, such as a monitoring agent located in a monitored network. The received data may undergo initial filtering or analysis in order to eliminate non-relevant raw data items, such as by running the data against a whitelist and/or one or more rules. In addition, the data may be automatically subject to one or more enrichments in order to provide additional context to a user for analysis and/or triage, such as being run against one or more third party analysis services. The data may also undergo contextual or temporal analysis in order to provide the user with additional context.

In some embodiments, the received data may be sorted, scored, or prioritized using one or more scoring rules and/or algorithms. The system may generate a score, multiple scores, and/or metascores for each received raw data item, and may optionally rank or prioritize the data items based on the generated scores and/or metascores. Raw data items satisfying one or more score thresholds may be designated as "data item leads" such that they may be further investigated by a user using the system (as described below).

Raw data items associated with a data item lead may be searched and displayed to the user via an interactive user interface. According to various embodiments, the data analysis system may be used by the user to execute searches and additional enrichments against the received raw data items. A user may also, in some embodiments, pre-apply one or more enrichments to a search, such that the search will be executed and the selected enrichments automatically applied to the retrieved search results.

According to various embodiments, the data analysis system may group received raw data items based upon shared attribute values, allowing a user to process batches of raw data items that share common attributes values instead of on an individual level.

According to various embodiments, the data analysis system may be used to categorize received data and construct timelines, histograms, and/or other visualizations based upon the various attributes of the raw data items, allowing the user to quickly visualize the distribution of raw data items among different attribute values.

Accordingly, in various embodiments, the user may use the system to determine a likelihood that a data item lead is associated with malicious (or other) activity by searching, enhancing, and analyzing various raw data items associated with the data item lead.

It has been noted that design of computer user interfaces "that are useable and easily learned by humans is a non-trivial problem for software developers." (Dillon, A (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may enable a user to more quickly and accurately access, navigate, enrich, assess, and digest large numbers of raw data items than previous systems.

Further, the interactive and dynamic user interfaces described herein are enabled by innovations in efficient interactions between the user interfaces and underlying systems and components. For example, disclosed herein are improved methods of searching for raw data items, applying enrichments on the raw data items, displaying the enriched raw data items in a plurality of different formats (e.g., table, histogram, and timeline), wherein a user selection relating to a first format may automatically trigger an update of the data displayed in a second format. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing interfaces for di splaying raw data items are limited in various ways, and various embodiments of the disclosure provide significant improvements over such technology. Additionally, various embodiments of the present disclosure are inextricably tied to computer technology. In particular, various embodiments rely on detection of user inputs via graphical user interfaces, retrieval and enrichment of raw data items based on those user inputs, generation of tables, histograms, and timelines based upon the retrieved raw data items, and manipulation of a displayed table based upon a user selection relating to a histogram and/or timeline, and/or the like. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of data including histograms, times lines, and other data items.

In an embodiment, a computer system configured generate an interactive graphical user interface for accessing, enriching, and analyzing a plurality of raw data items is disclosed, the computer system comprising one or more computer readable storage devices configured to store a plurality of computer executable instructions and a plurality of raw data items, wherein a raw data item is associated with one or more attributes, wherein the one or more attributes comprise at least one time-based attribute; and one or more hardware computer processors in communication with the one or more computer readable storage devices. In some embodiments, the one or more hardware processors are configured to execute the plurality of computer executable instructions in order to cause the computer system to: identify a data item lead from the plurality of raw data items; receive one or more search parameters based at least in part upon an attribute associated with the data item lead; query the plurality of raw data items based at least in part upon the received search parameters to receive a first group of raw data items; and generate an interactive graphical user interface to display the first group of raw data items. In some embodiments, the interactive graphical user interface comprises a display area comprising a table that displays in a tabular format a first set of raw data items corresponding to at least a portion of the first group of raw data items; and at least one of: a display area displaying a histogram of at least the first set of raw data items, wherein data items of the first set of raw data items are grouped based at least in part upon shared attribute values of a selected attribute of the one or more attributes; and a display area displaying a timeline of at least a portion the first set of raw data items, based at least in part upon a time-based attribute of the at least one time-based attribute. The computer executable instructions may further be configured to cause the computer system to receive, via the interactive graphical user interface, a user selection of at least one shared attribute value associated with the histogram or at least one time-based attribute value associated with the timeline; and, in response to the receiving the user selection, update the table such that the table displays only raw data items of the first set of raw data items corresponding with the selected at least one common attribute value or the selected at least one time-based attribute value.

In some embodiments, a raw data item may correspond to an occurrence of a proxy request on a monitored network. In some embodiments, a raw data item may correspond to an occurrence of a process on a device on a monitored network.

In some embodiments, identifying a data item lead may comprise receiving the plurality of raw data items from one or more data sources, performing initial analysis or filtering on the plurality of raw data items, performing at least one enrichment on the plurality of raw data items, calculating scores for the plurality raw data items, and identifying a raw data item of the plurality of raw data items having a score satisfying a threshold as a data item lead.

In some embodiments, performing initial analysis or filtering on the plurality of raw data items comprises running the plurality of raw data items against a whitelist. Performing at least one enrichment on the plurality of data items may comprise performing an external analysis on the plurality of raw data items using one or more third party analysis systems. In some embodiments, performing at least one enrichment on the plurality of data items may comprise determining a frequency or distribution of an event associated with a raw data item of the plurality of raw data items.

In some embodiments, the plurality of computer executable instructions are configured to further cause to computer system to perform an aggregation of raw data items of the first group of raw data items based at least in part upon an attribute value.

In some embodiments, the first group of raw data items comprises raw data items of two or more data types, wherein the raw data items are separated into two or more tabs in the interactive user interface, based upon a type of the raw data items. The raw data items displayed by the histogram may comprise raw data items associated with a currently displayed tab. The raw data items displayed by the timeline may comprise raw data items associated with of all tabs of the two or more tabs.

In some embodiments, the selected attribute is associated with one or more attribute value groups, wherein the histogram groups data items of the first set of raw data items using the one or more attribute value groups.

In some embodiments, the selected attribute is selected from the one or more attributes based at least in part upon a selection by a human analyst. In some embodiments, the time-based attribute of the at least one time-based attribute is selected based at least in part upon a selection by a human analyst. In some embodiments, the first set of raw data items may comprise the first group of raw data items.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 3C illustrates an example interface for displaying retrieved raw data items associated with a data item lead, in accordance with some embodiments.

FIGS. 4B-4D illustrate an example interface for configuring data enrichments in accordance with some embodiments.

DETAILED DESCRIPTION

Figure 1:
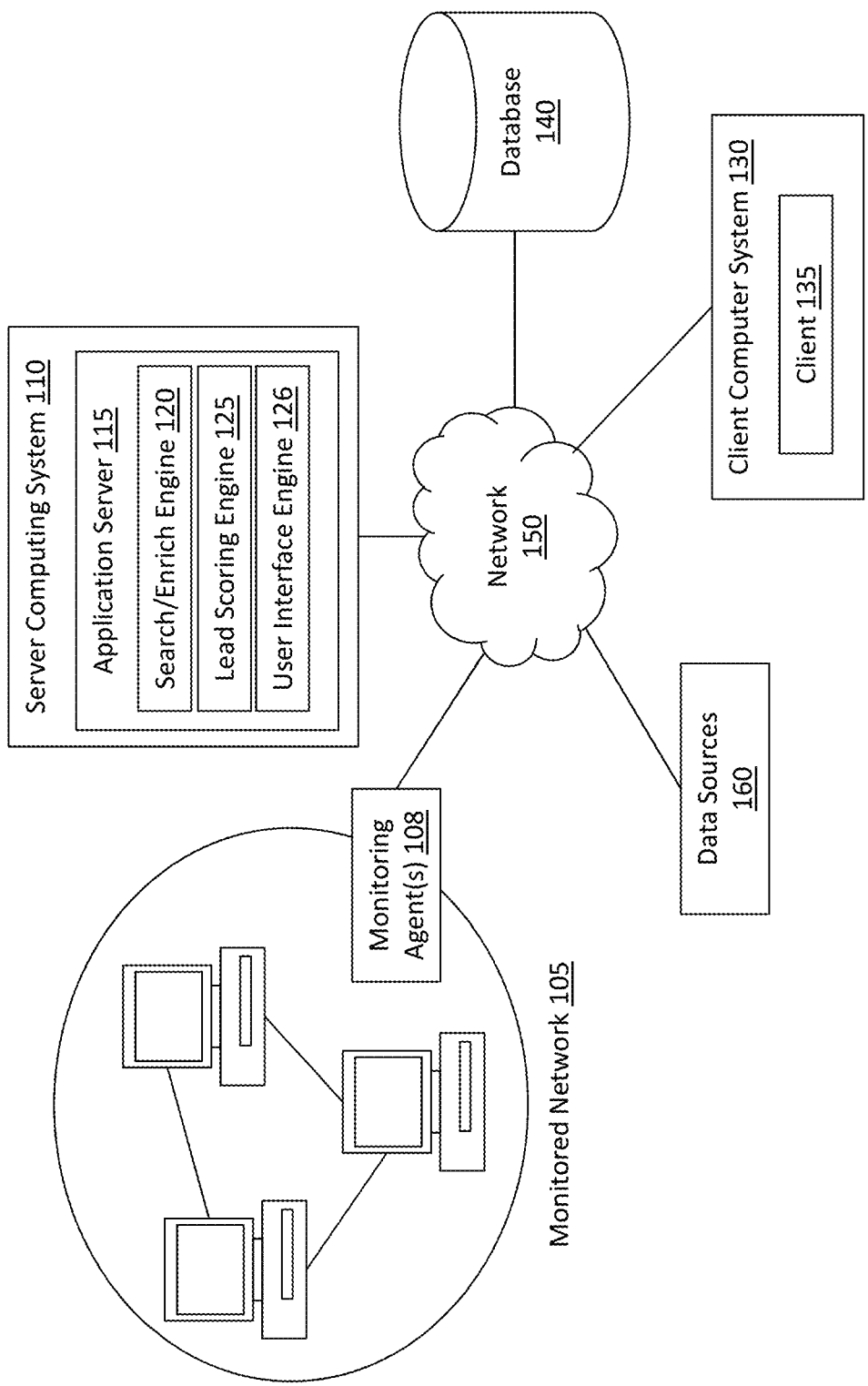
FIG. 1 is a block diagram illustrating an example data analysis system, according to embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure.

Data Item (Item), Data Object (Object), or Data Entity (Entity): A data container for information representing a specific thing, or a group of things, in the world. A data item may be associated with a number of definable properties (as described below). For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data item,"

"data object," "data entity," "item," "object," and "entity" may be used interchangeably and/or synonymously in the present disclosure.

Raw Data Item: A data item received by a data analysis system for analysis. Raw data items may be received, for example, from one or more network monitors and/or other data sources, as described below. It is understood that the term "raw data item," as used in the present disclosure, may include data obtained through the performance of enrichments, including enrichments performed during pre-processing and/or post-processing.

Data Item Lead: A raw data item that has a calculated score, metascore, or alert level above a certain threshold, or has otherwise been flagged or designated for further analysis.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user 1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Overview

Embodiments of the present disclosure relate to a data analysis system (also referred to herein as "the system") that may retrieve and enrich data from a monitored network or other data source, and present the data to an analyst via a user interface for further analysis and triage.

Detection of the presence of malware and/or other malicious activity occurring on a network is a highly important, but oftentimes challenging task. Detection of malware and malicious activity is of particular importance to organizations (for example, businesses) that maintain internal networks of computing devices that may be connected to various external networks of computing devices (for example, the Internet) because infection -12- of a single computing device of the internal network may quickly spread to other computing devices of the internal network and may result in significant data loss and/or financial consequences.

Detection of the presence of malware and/or malicious activity on a monitored network may be performed through the examination of activity occurring on the monitored network over time. Previously, determination and identification of malware or malicious activity through the examination of network activity was a labor intensive task. For example, an analyst may have had to pore through numerous tracking logs and other information of the monitored network, manually discern patterns and perform analyses to gain additional context, and compile any information gleaned from such analyses.

In various embodiments of the data analysis system described herein, the system may receive data comprising a plurality of raw data items from one or more data sources, such as a monitoring agent located in a monitored network. The raw data items may comprise any type of information that may be relevant for analyzing and detecting network activity (for example, the presence of malware and/or malicious behavior on the network). For example, such information may include proxy requests from endpoints (or other devices) within the monitored network to outside domains, requests between network devices in the monitored network, processes running on network devices in the monitored network, user logins on network devices in the monitored network, etc. In the context of malware detection, one example of a raw data item may be information associated with a software process running on a computer (for example, the name of the process, any associated processes, a time the process was activated, any actions taken by the process, and/or the like). Another example of a raw data item in the context of malware detection may be information associated with communications between a network device and an external domain or IP address (for example, an identifier of the network device, a time of the connection, an internal IP address of the network device, the external domain and/or IP address connected to, an amount of data transferred, and/or the like).

Network devices of the monitored network may include, for example, any type of computerized device, such as a desktop or laptop computer, a point of sale device, a smartphone, a server (for example, a proxy server), a network router, and/or the like. -13- Monitoring agents may include, for example, software applications running on a network device, a dedicated hardware device (for example, a router configured to monitor network traffic), and/or the like.

The received data may undergo initial filtering or analysis in order to eliminate non-relevant raw data items, such as by running the data against a whitelist and/or one or more rules. In addition, the data may be automatically subject to one or more enrichments in order to provide additional context to a user for analysis and/or triage. For example, the data may be run against one or more third party analysis services, such as virus or malware detection services. The data may also undergo contextual or temporal analysis (to, for example, analyze a frequency or spread of a particular event in the network, and/or identify other events that occur temporally close to a particular event) in order to provide the user with additional context.

In addition, the received data may be sorted, scored, or prioritized using one or more scoring rules/algorithms. The system may generate a score, multiple scores, and/or metascores for each received raw data item, and may optionally rank or prioritize the data items based on the generated scores and/or metascores. For example, high priority data items may indicate a higher likelihood of malware or malicious behavior, and thus be of greater interest to an analyst. Raw data items satisfying one or more score thresholds may be designated as "data item leads" such that they may be further investigated by a user using the system (as described below).

According to various embodiments, the data analysis system may be used by a user (also referred to herein as an "analyst") to execute searches and/or additional enrichments against the received data item leads. Searches allow the user to access the various raw data items (including any enrichments, as mentioned above) associated with a data item lead in order to investigate a likelihood that the data item lead represents a data item of interest (for example, an indication of malicious activity, such as by malware). The use may use the system narrow the raw data item search results and/or view new sets of raw data items associated with the data item lead for analysis. Enrichments may be used by the user to supplement displayed raw data items with additional context beyond that provided by the initial analysis and/or initial enrichment. A user may, in some embodiments, also pre-apply one or more enrichments to a search, such that the search will be executed and the selected enrichments automatically applied to the retrieved search results (for example, the raw data items satisfying the search).

According to various embodiments, the data analysis system may group received raw data items based upon shared attribute values, allowing a user to, instead of having to pour through raw data items on an individual level, drill down or perform other types of actions on batches of raw data items that share common attributes values.

According to various embodiments, the data analysis system may be used to categorize received data and construct timelines, histograms, and/or other visualizations based upon the various attributes associated with the raw data items, allowing a user to quickly visualize the distribution of raw data items among different attribute values. For example, a user may categorize certain received raw data items, and construct a timeline of the raw data items of that category, allowing the user more insight into a chronology of events. Accordingly, in various embodiments, the user may determine a likelihood that a data item lead is associated with malicious (or other) activity by searching, enhancing, and analyzing various raw data items associated with the data item lead.

In various embodiments, and as mentioned above, the data analysis system may be used in various data analysis applications. Such applications may include, for example, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection. While, for purposes of clarity, the present disclosure describes the system in the context of malware (and/or other malicious activity) detection, examples of other data analysis applications are described in U.S. patent application Ser. No. 14/473,920, titled "External Malware Data Item Clustering and Analysis," filed on Aug. 29, 2014, and in U.S. patent application Ser. No. 14/139,628, titled "Tax Data Clustering," filed on Dec. 23, 2013. The entire disclosure of each of the above items is hereby made part of this specification as if set forth fully herein and incorporated by reference for all purposes, for all that it contains.

In the following description, numerous specific details are set forth to provide a more thorough understanding of various embodiments of the present disclosure. However, it will be apparent to one of skill in the art that the systems and methods of the present disclosure may be practiced without one or more of these specific details.

DESCRIPTION OF THE FIGURES

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

FIG. 1 is a block diagram illustrating an example data analysis system 100, according to one embodiment. As shown in the embodiment of FIG. 1, system 100 includes an application server 115 running on a server computing system 110, a client 135 running on a client computer system 130, and at least one database 140. Further, the client 135, application server 115, and database 140 may communicate over a network 150, for example, to access data sources 160 and/or a monitored network 105.

In some embodiments, the application server 115 may include a search/enrichment engine 120, a lead scoring engine 125, and a user interface engine 126. The search/enrichment engine 120, lead scoring engine 125, and user interface engine 126 may be software modules as described below in reference to FIG. 7.

According to an embodiment, the search/enrichment engine 120 is configured to receive data for analysis from one or more data sources (e.g., data sources 160 and/or monitored network 105), comprising one or more raw data items. In addition, search engine 120 may receive one or more user inputs in order to search through and/or filter the -16- received raw data items to be presented to the user for analysis and/or triage. In some embodiments, search/enrichment engine 120 may also be configured to enrich or supplement retrieved raw data items with additional information. For example, the search/enrichment engine 120 may receive data comprising raw data items containing source IP addresses corresponding to proxy requests associated with a monitored network, and further enrich the received data by accessing additional data sources to map the received sourced IP addresses with additional information related to the source IP addresses, such as computer hostname associated with the source IP address, computer owner, etc.

In some embodiments, the search/enrichment engine 120 may receive multiple types of data from one or more data sources, and enrich the data by correlating the data of different types. For example, the search/enrichment engine 120 may receive from the monitored network 105 proxy request data, endpoint log data, and monitoring agent data specifying processes running on the monitored network. The data may be enriched by correlating the network traffic associated with the proxy requests to software associated with the processes running on the network devices.

In an embodiment, the lead scoring engine 125 is configured to score received raw data items or groupings of raw data items according to one or more scoring strategies, wherein the score indicates an importance or priority for further analyzing the raw data items and/or groupings. For example, lead scoring engine 125 may execute one or more scoring strategies that analyze the occurrences of particular processes or process types in a network environment in order to identify possible malware or malicious behavior.

For example, lead scoring engine 125 may identify certain software processes that are run with high frequency or during unusual times as indicative of possible malware, and thus associate the processes with a high score for further analysis. In addition, additional information such as user information may be taken into account when identifying particular processes (e.g., certain types of users may be associated with certain types of processes, while those same processes being run on computing devices associated with other types of users may be indicative of possible malware or malicious behavior). In some embodiments, a high spread rate of occurrences of a particular process among computing devices in a network may be flagged by lead scoring engine 125 as a candidate for analysis. In -17- some embodiments, different scores may be generated based upon different attributes and/or combinations of attributes associated with the data items or groupings of data items, which may then be aggregated to form an overall score or metascore for the data item.

In addition, in some embodiments lead scoring engine 125 may receive inputs from a user when generating scores for the received raw data items. For example, a first analyst may view the received data items or a subset thereof, and assign or modify scores of the raw data items for further review by a second analyst.

In an embodiment, the user interface engine 126 generates various user interfaces of the data analysis system as described below. In one embodiment, the search/enrichment engine 120, in conjunction with the lead scoring engine 125 and user interface engine 126, organizes and presents data items to the analyst/user. In the example of identifying data items leads, scored raw data items may be presented to the user according to the assigned scores. In the example of analyzing data item leads by searching, enriching, and/or analyzing raw data items associated with the data items leads, various analyses of the raw data items may be presented to the user. The user interfaces may be generated as web applications and/or dynamic web pages displayed within the client 135. The user interfaces are interactive such that a user may make selections, provide inputs, and/or manipulate outputs. Example user interfaces that may be used in some embodiments are discussed in detail below in conjunction with various figures.

The client 135 may represent one or more software applications or modules configured to present data and translate input, from the analyst, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In one embodiment, the client 135 may be a browser accessing a web service.

While the client 135 and application server 115 are shown running on distinct computing systems, the client 135 and application server 115 may run on the same computing system. Further, the cluster engine 120 and the workflow engine 125 may run on separate applications servers 115, on separate server computing systems, or some combination thereof. Additionally, a history service may store the results generated by an analyst relative to a given data item or set of data items.

In one embodiment, the data sources 160 provide data available to the application server 115 for analysis and triage. Such data sources may include relational data sources, web services data, XML data, and the like. Further, such data sources may include a variety of information and data, for example, personal information, financial information, tax-related information, computer network-related data, and/or computer-related activity data, among others. For example, the data sources may be related to customer account records stored by a financial institution. In such a case, the data sources may include a credit card account data, bank account data, customer data, and transaction data. The data may include data attributes such as account numbers, account balances, phone numbers, addresses, and transaction amounts, and the like. Of course, data sources 160 is included to be representative of a variety of data available to the server computer system 110 over network 150, as well as locally available data sources.

For example, in some embodiments, data sources 160 may include data pertaining to a monitored network 105. Monitored network 105 may correspond to any type of computer network where it is desired to perform data monitoring and analysis, such as a network for a business, bank, government agency, grocery store, etc. Monitored network 105 may comprise one or more computing devices, which include personal computers, laptops, servers, mobile devices, tablets, cash registers, ATM machines, checkout devices, point of sale devices, etc. In some embodiments, a monitored network 105 may comprise at least one endpoint device capable of connecting directly to external networks (e.g., a server capable of connecting to network 150), as well as at least one device not capable of connecting directly to an external network (e.g., an ATM machine of point of sale device that can only connect to other devices in monitored network 105).

In order to gather data from monitored network 105, monitored network 105 may be associated with one or more monitoring agents 108. In some embodiments, a monitoring agent 108 may be installed on at least one device of monitored network 105. In some embodiments, monitoring agents 108 may be installed on multiple devices of monitored network 105. In yet other embodiments, a monitoring agent 108 may be installed on a computing system external to monitored network 105 that is able to communicate with at least one device in monitored network 105. As mentioned above, monitoring agents 108 may include, for example, software applications running on a network device, a dedicated hardware device (for example, a router configured to monitor network traffic), and/or the like. As also mentioned above, network devices of the monitored network may include, for example, any type of computerized device, such as a desktop or laptop computer, a point of sale device, a smartphone, a server (for example, a proxy server), a network router, and/or the like.

Monitoring agents 108 may be used to gather any type of data desired to be monitored or analyzed by data analysis system 100. For example, monitoring agent 108 may be used to monitor proxy requests associated with the network. This may include requests between monitored network 105 and outside domains and/or requests made between different devices within monitored network 105. In some embodiments, monitoring agent 108 may be used to monitor network device logs, in order to determine what processes are running on one or more devices of monitored network 105. In various embodiments, monitoring agents 108 may be used to monitor user logins on monitored network 105, other types of data related on monitored network 105, and/or any combination of the above examples. As mentioned above, data gathered by the monitoring agents 108 are referred to herein as "raw data items."

The database 140 may be a Relational Database Management System (RDBMS) that stores the data as rows in relational tables. The term "database," as used herein, may refer to an database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the database 140 is shown as a distinct computing system, the database 140 may operate on the same server computing system 110 as the application server 115.

Figure 2A:
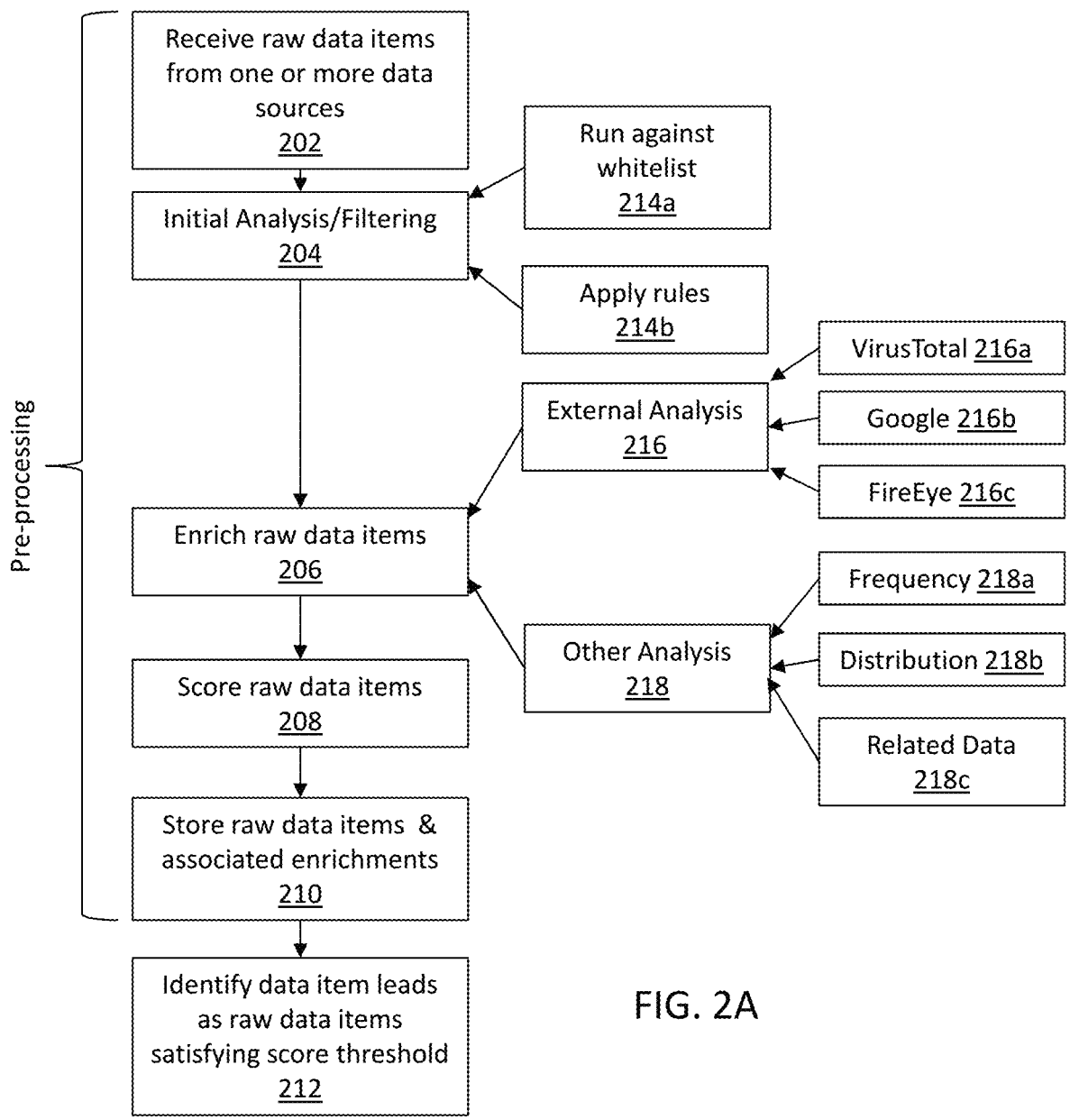
FIG. 2A illustrates a flowchart of an example method of identifying data item leads, according to embodiments of the present disclosure.

FIG. 2A is a flowchart of an example method of identifying data items leads, according to embodiments of the present disclosure. Although the method is described in conjunction with the system of FIG. 1, persons skilled in the art will understand that any system configured to perform the method, in any order, is within the scope of this disclosure. Further, the method illustrated in FIG. 2A may be performed in conjunction with various other methods described below including methods for grouping received data items by common attributes (FIG. 2B), performing enrichments on received data (FIG. 4A), etc.

In the embodiment of the flowchart of FIG. 2A, at block 202, data comprising one or more raw data items is received. The data may be received from a monitoring agent (e.g., monitoring agent 108 illustrated in FIG. 1), and/or one or more other data sources. For example, the received data may correspond to proxy requests on the monitored network, or to processes running on devices in the monitored network. It is appreciated that the above types are given for purposes of example, and that in other embodiments other types of data or combinations of different types of data may be received.

At block 204, the received data comprising the raw data items may be optionally subject to initial filtering or analysis. In some embodiments, the data may be run against a whitelist (block 214a), wherein raw data items may be designated as not being of interest, and therefore not data item leads. For example, if the data includes raw data items, each representing a process running on devices in a monitored network, the whitelist may specify processes that are known to be benign, and thus do not need to be subjected to further analysis or triage. This initial filtering allows for the amount of data needing to be analyzed to be quickly reduced, cutting down analyst workload, as well as storage and processing requirements. In some embodiments, the whitelist may be provided by a client 135, or by another party (e.g., a third party). In some embodiments, whitelisted data items may be removed from the received data, while in other embodiments, the whitelisted data may, instead of being removed, be categorized or scored (e.g., designating a data item as "low" priority for further analysis). Further details regarding scoring and/or categorizing of data items are described below.

In addition or in the alternative, other types of filtering or analysis may also be performed on the received raw data items. For example, one or more rules may be applied to the received data (block 214b). The rules may be used to filter out certain types of data, or to designate certain raw data items into certain predefined categories.

At block 206, the raw data items may be enriched or supplemented with additional information. In some embodiments, this may comprise subjecting the received data to external analysis (block 216). The external analysis is generally performed by one or more computing devices external to the system, however in some embodiments aspects (or all aspects) of the external analysis may be performed by the system. The external analysis of the data items may include, for example, analysis of the file data item by one or more third-party analysis providers (for example, VirusTotal (block 216a), FireEye (block 216c), and/or the like), aggregation of data items related to the submitted file data item (for example, performing a web search, such as a Google search (block 216b), based upon the raw data item), and/or the like. The one or more third-party analysis providers may then transmit one or more analysis information items back to the system, where it may be associated with the raw data items and displayed to the analyst. Any information determined and/or obtained via one or more external analysis processes may be referred to herein as external analysis information items, and such external analysis information items are associated with the data item analyzed.

In addition or in the alternative, the raw data items may also undergo other types of analysis and/or enrichment (block 218). For example, for data corresponding to occurrences of proxy requests, device processes, and/or the like on a monitored network, additional analysis may comprise determining the frequency that the particular request or process occurs on the network (block 218a). In some embodiments, the analysis may determine the distribution of occurrences in a given time period (block 218b). For example, it may be determined that a particular process was run by a certain number of devices in the monitored network within a specified time period.

In some embodiments, additional analysis/enrichment may also comprise associating the raw data items with related data (block 218c). For example, a raw data item corresponding to an occurrence of a process running on a device in a monitored network may be associated with occurrences of other processes running within a specified time period on the same device, with a parent process (if any), and/or the like. By performing these additional types of analysis and/or enrichment, the data may be provided with additional context that may be used to score/prioritize the raw data items, and/or aid a user during analysis and triage. The additional context/information obtained through this enrichment may also be referred to as analysis information items, and may be stored along with the raw data items in, for example, the data sources 160.

Example systems and methods for performing pre-processing on data items, including enrichments and/or external analysis, are disclosed in U.S. patent application Ser. No. 14/473,860, titled "Malware Data Item Analysis," filed on Aug. 29, 2014, which is hereby made part of this specification as if set forth fully herein and incorporated by reference for all purposes, for all that it contains.

In some embodiments, the raw data items may be scored at block 208. The score may indicate the importance of further analyzing the raw data item. For instance, a scoring strategy may be executed that examines the frequency and spread of processes running in a monitored network. For example, a data item corresponding to a process that runs on a large number of devices in a monitored network may be given a high score compared to a data item corresponding to a process that only runs on a smaller number of devices.

Similarly, a process that experienced a large increase in distribution on a monitored network may be given a higher score than a process with relatively constant distribution. Thus, a data item with a higher score relative to a data item with a lower score may be considered more important to analyze.

In some embodiments, a raw data item may be scored by in accordance with one or more cluster rules/strategies. Example methods for scoring data items (and/or clusters of data items) are described in U.S. patent application Ser. No. 14/473,920, titled "External Malware Data Item Clustering and Analysis," filed on Aug. 29, 2014, the entire disclosure of which is hereby made part of this specification as if set forth fully herein and incorporated by reference for all purposes, for all that it contains.

In some embodiments, human input and analysis may be used when scoring the raw data items. For example, a first analyst may view the received raw data items and designate a score or priority level, indicating an importance for further analysis by a second analyst.

At block 210, the raw data items (along with any associated enrichments and/or scores) may be stored in a database or data store. At block 212, raw data items that satisfy a score threshold as identified as data item leads. For example, raw data items may be designated as being "high," "medium," or "low" priority, wherein only the data items having "high" priority are initially identified as data item leads. In some embodiments, only the identified data item leads are initially displayed to a user at a user interface, instead of all of the raw data items. This allows the user to begin the analysis focused on data items that have a high probability of yielding relevant results, and without being overwhelmed by a potentially very large number of raw data items.

A user may initiate searches on the data item leads, and/or specify additional enrichments to be performed on the data associated with the data items leads (as described below). Even though the user may initially only be presented with a subset of the raw data items (e.g., the data item leads), in some embodiments the entirety of the raw data items remain available for the user for searching and performing of enrichments. For example, in some embodiments, a user may, when analyzing data item leads corresponding to certain proxy requests from a monitored network, may search the entirety of the stored raw data items to find other proxy requests that occurred in the same time period as the displayed proxy requests, even though those raw data items were not initially displayed to the user as data item leads.

Figure 2B:
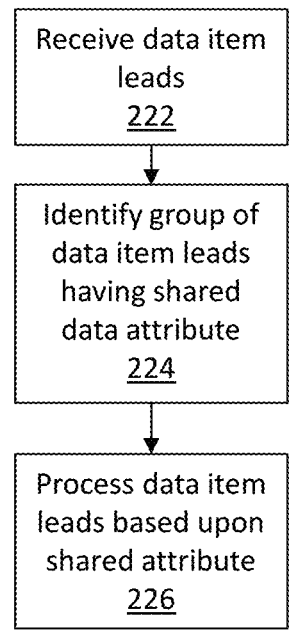
FIG. 2B illustrates a flowchart of an optional process for performing additional processing on the identified data item leads in accordance with some embodiments

FIG. 2B illustrates a flowchart of an optional process for performing additional processing on the identified data item leads in accordance with some embodiments. At block 222, data comprising one or more identified data item leads is received. The received data item leads are each associated with one or more attributes or properties. For example, a data item corresponding to a process running on a monitored network may contain attributes corresponding to process name, device the process was running on, time the process was running, software associated with the process, parent processes (if any), etc. The attributes for a data item lead may have been associated with the original raw data items received from one or more data sources (e.g., at block 202, illustrated in FIG. 2A), or received through the performance of one or more enrichments (e.g., at block 206, illustrated in FIG. 2A).

At block 204, a group of data item leads having one or more shared attribute values is identified. For example, a monitored network may comprise a number of different devices, each running one or more processes over different time periods. The data item leads corresponding to device process logs may be grouped by various attributes such as device attributes, process attributes, time attributes, and/or any combination thereof. For example, a data item group may comprise all data item leads corresponding to processes that were run on a particular device in the monitored network.

At block 206, the group of data item leads is processed based at least in part upon the identified shared attribute(s). For example, it may be determined that a certain type of process originating from a particular type of device may be indicative of malware or malicious behavior. Instead of having to comb through individual data item leads, how the data item leads are distributed with regards to particular attributes can be quickly determined. In addition, actions can be performed on the group of data item leads having shared attribute values as a batch instead of on the data item leads individually. For example, a particular attribute value (e.g., data items originating from a particular device) may be selected, and an action performed on all data items having that attribute value (e.g., flagging the data items for further analysis). In another example, an analyst may determine that a group of data item leads is not associated with malicious activity (or otherwise interesting for further analysis). In this example, the analyst may dismiss the group of data item leads as a whole, rather than investigating each data item lead individually.

In some embodiments, the processes illustrated in FIG. 2B may be performed on raw data items instead of data item leads. For example, when determining scores for raw data items, a score for a particular raw data item may be based at least in part upon processing performed on a group of raw data items having shared attribute values that the particular raw data item is a member of.

Displaying the Data

In some embodiments, when displaying data item to a user, received data items may be displayed as individual data entries, such as rows in a table or spreadsheet. In addition, in order to facilitate analysis, other formats for displaying the data may also be used, such as displaying the data in a batch format based upon shared attributes between different data items. Doing so may allow an analyst viewing the data to be able to quickly perform analysis or triage on groups of data items having common attributes, instead of having to comb through data items on an individual level.

Figure 3A:
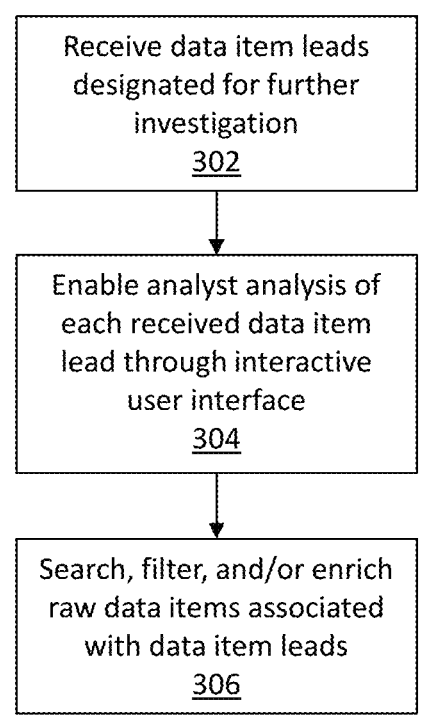
FIG. 3A illustrates a flowchart of a high level process for the processing of data item leads, in accordance with some embodiments.

FIG. 3A illustrates a flowchart of a high level process for the processing of data item leads, in accordance with some embodiments. At block 302, data comprising one or more data item leads is received. The data item leads correspond to data items that have been designated as deserving of further investigation (as described above in reference to FIGS. 2A and 2B). For example, in some embodiments the data item leads correspond to raw data items determined to have a score, metascore, or alert level meeting or exceeding a threshold value.

At block 304, a user or analyst is enabled to analyze each of the received data item leads via an interactive user interface, as described below. For example, in some embodiments the data item leads may be displayed using an interactive user interface containing one or more interactive controls.

At 306, a user or analyst performs a search, filter, and/or enrichment of raw data items associated with the data item leads. For example, after viewing a data item lead, the user may identify one or more search terms based on the attributes of the data item lead that warrants further investigation, or desire to obtain additional context information regarding the received data item lead through an enrichment. The search, filter, and/or enrichment may be performed by the user interacting with one or more interactive controls on the interactive user interface.

Figure 3B:
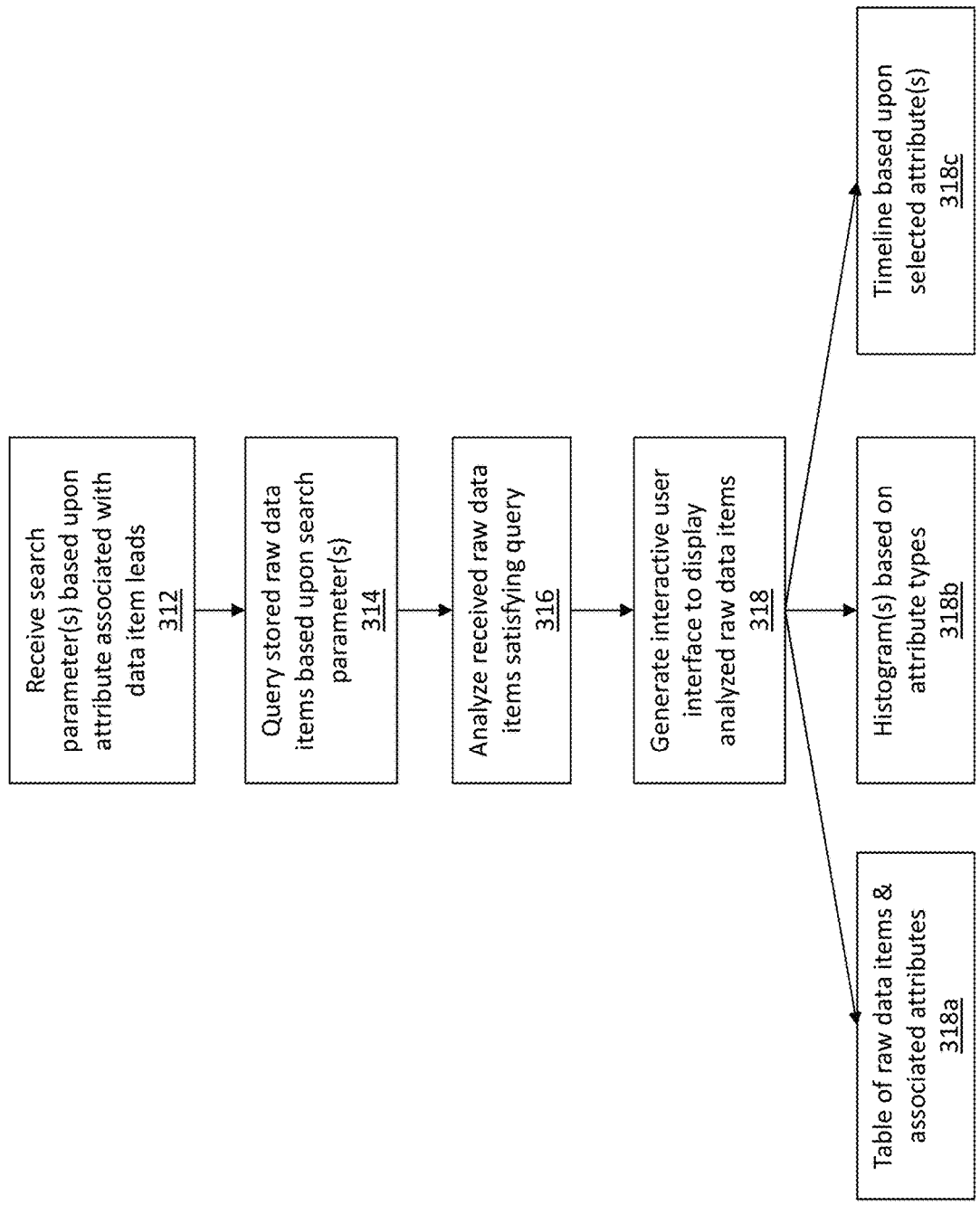
FIG. 3B illustrates a flowchart of a process for retrieving and displaying raw data items associated with data item leads, in accordance with some embodiments

FIG. 3B illustrates a flowchart of a process for retrieving and displaying raw data items associated with data item leads in accordance with some embodiments. At block 312, one or more search parameters are received, wherein the received search parameters are based at least in part upon one or more attributes associated with a data item lead (which attributes may include attributes originally associated with the data item lead, as well as attributes later associated with the data item lead as a result of performing one or more enrichments). In some embodiments, the search parameters may also specify a filter or an enrichment to be performed on one or more raw data items or data item leads.

At block 314, a query is formed based at least in part upon the search parameters, and used to query the stored raw data items. In addition, the parameters may also specify one or more filters and/or enrichments may also be performed on the queried data items.

At block 316, analysis may be performed on the received raw data items satisfying the query. For example, in some embodiments, the received raw data items may be categorized or grouped based upon attribute values. The analysis may also comprise one or more aggregations or other computations (e.g., computing a count of how many of the received raw data items have a particular attribute value, and/or the like).

At block 318, an interactive user interface is generated, allowing the received raw data items are displayed to the user. One or more formats may be used to display the received raw data items. For example, the interactive user interface may contain one or more different display areas, wherein the raw data items or a subset of the raw data items are displayed using a different format in each different display area. In some embodiments, the data items may be displayed as a table, wherein rows correspond to individual raw data items and columns correspond to raw data item attributes (block 318*a*). The raw data items may also be displayed as in batches or groups as a chart or histogram (block 318*b*), and/or as a timeline based upon one or more selected attributes (block 318*c*).

Figure 3C:
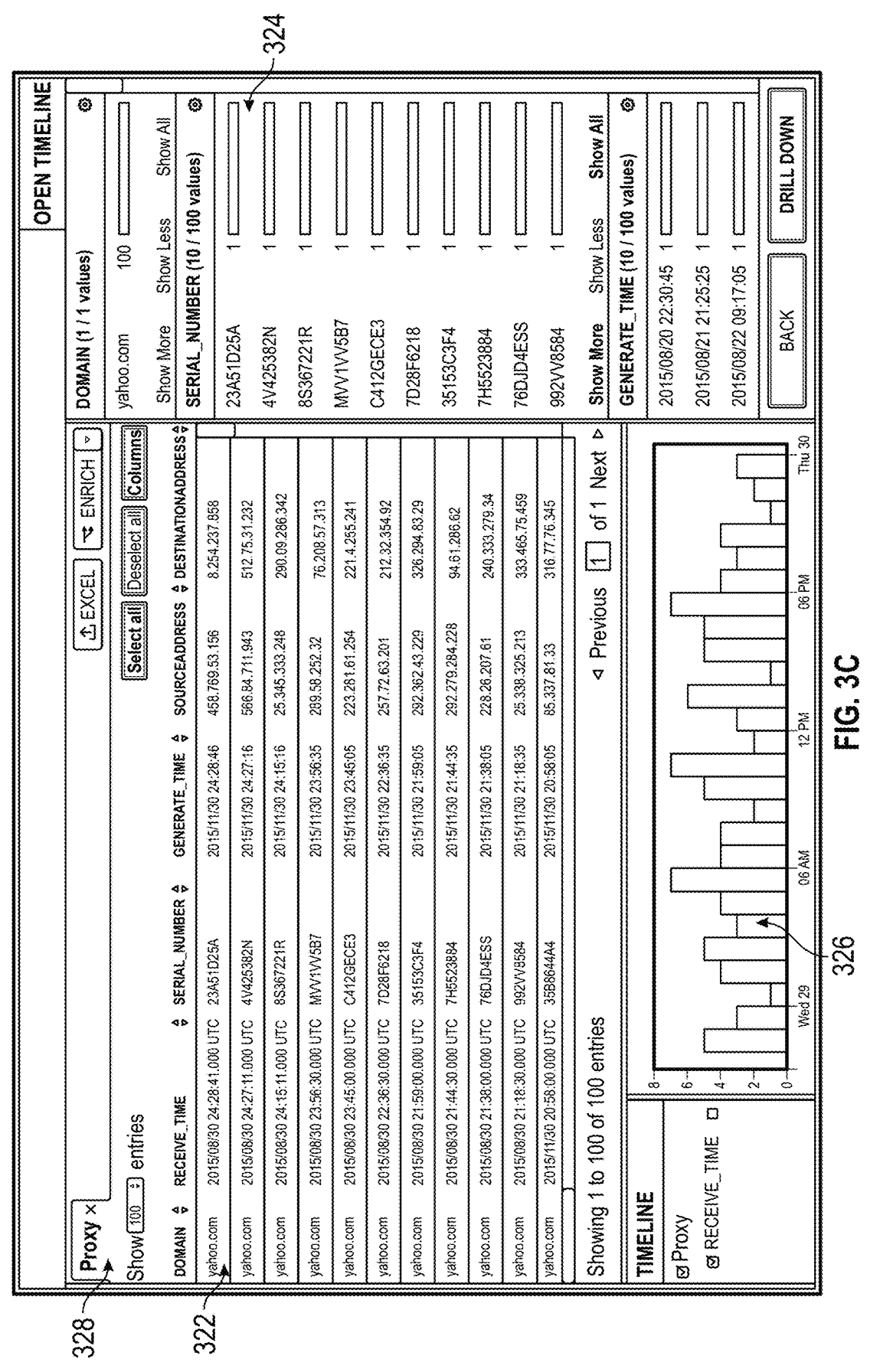

FIG. 3C illustrates an example user interface that may be used for displaying the analyzed raw data items associated with a data item lead, in accordance with some embodiments. The interface illustrated in FIG. 3C is divided into a plurality of display areas. For example, display area 322 may be used to display the individual raw data items in a tabular format, with columns corresponding to attributes of the raw data items. As used herein, the term "tabular format" is a broad term including its ordinary and customary meaning, including, but not limited to, any display format utilizing rows and columns, the rows corresponding to entities (e.g., raw data items) and column corresponding to attributes associated with the entities, or vice versa.

On the other hand, display area 324 groups raw data items together in histograms (e.g., graphical representations of distributions of data) based upon shared attribute values. As used herein the term "histogram" is a broad term including its ordinary and customary meaning, including, but not limited to, any representation (e.g., a visual display) of a distribution data (e.g., entities, data items, raw data items, etc.) according to one or more attributes associated with the data. For example, a histogram may be generated by sorting an attribute associated with one or more data items into one or more ranges or buckets (e.g., a time attribute may be associated with a plurality of buckets, each corresponding to a particular time period, wherein all data items having a time attribute value that falls within the same time period may be placed in the same bucket). The histogram may then be displayed in a chart or graph in which entries in the chart or graph correspond to the attribute value buckets or ranges instead of individual attribute values. For example, display area 324 contains a histogram corresponding to the "Serial Number" attribute, with individual entries corresponding to unique values of the attribute. The number of raw data items having each property value is counted and displayed. While the example of FIG. 3C shows a single value for each serial number, in other examples multiple raw data items may include a same attribute value. In addition, display area 324 may also contain bars, lines, or other graphical elements displaying the relative number of raw data items having a particular attribute value in comparison with other values, allowing the user to easily visualize the distribution of raw data items over different values of the attribute. In some embodiments, a user may interact with a control associated with a particular attribute value or value range/bucket, in order to perform an action on the raw data items having that value (e.g., drill down deeper, and/or flag the data items). For example, selection of a particular attribute value or value range/bucket of a histogram displayed in the display area 324 may cause the table of display area 322 to be automatically updated to display only raw data items that share the particular attribute value or value range/bucket (and also satisfy the search parameters). In some embodiments, display area 324 may contain multiple histograms each corresponding to a different attribute. For example, in the illustrated embodiment, display area 324 contains histograms for the Domain attribute, the Serial number attribute, and the Generate time attribute.

Display area 326 may be used to display a timeline of the raw data items and/or a subset of the raw data items. A timeline may be constructed when the raw data items are associated with one or more time-based attributes (e.g., a time that a proxy request occurred or a process was run). The user may identify one or more attributes or combinations of attributes specifying the raw data items to be included in the timeline via one or more user-selectable elements (for example, the check boxes to the left of the timeline). For example, the user may desire to view a timeline of proxy requests originating only from a particular device, a timeline of occurrences of processes of a certain types, and/or the like. Also, it is understood that in other embodiments, graphs or histograms may be constructed that are based upon other attributes of the received raw data items. In some embodiments, the time-based attribute used to construct the timeline is divided into a number of buckets or time frames each corresponding to a period of time (e.g., a minute, hour, or day).

In some embodiments, a user may interact with a control associated with a particular bucket or time frame of a displayed timeline, in order to perform an action on the raw data items falling within that bucket or time frame. For example, selection of a particular bucket or time frame of a timeline displayed in display area 326 may cause the table of display area 322 to be automatically updated to display only raw data items that fall within the selected bucket or time frame (and also satisfy the search parameters). In some embodiments, a user selection on a histogram in display area 324 may cause an update to the timeline in display area 326, or vice versa. For example, a selection of a particular attribute value or value range/bucket in a histogram may cause the timeline in display area 326 to reflect only the raw data items associated with the selected value or value range/bucket.

In some embodiments, raw data items displayed as a result of a search may correspond to one or more different data types. For example, a single search of stored data items may return data items corresponding to proxy requests, as well as raw data items corresponding to users on a monitored network. Raw data items that are of different data types may be accessed from different databases or from different tables in a database, and may be displayed together or in separate parts of the user interface. For example, as illustrated in FIG. 3C, display area 322 may contain one or more tabs 328, specifying the particular data type being viewed in display area 322. For example, other tabs may be displayed corresponding to other data types, each being selectable by a user. Selection of the various displayed tabs may cause a corresponding table of raw data items of the respective data types to be displayed in the display area 322. In addition, the tab selected at 328 may affect the data that is displayed in other display areas. For example, in some embodiments, the histogram displayed in display area 324 reflects only the data that is displayed in the current tab. In some embodiments, whether a particular display area reflects data from a single tab, multiple tabs, or all tabs may be configured by the user. For example, the display area 326 may contain one or more checkboxes or other interfaces elements, wherein the user may select which tabs that the displayed timeline will reflect. In addition, the user may specify the time-based attribute associated with the data type of each type. For example, the time-based attribute associated with the proxy data type is given as "receive time," while other data types may have different time-based attributes (or even multiple attributes) that can be used for timeline construction. When multiple time-based attributes associated with multiple data types are shown and selected in the display area 326, each different attribute may be shown in a difference color in the timeline.

Figure 3D:
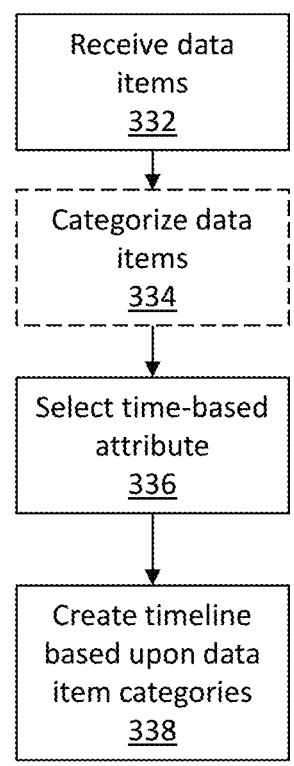
FIG. 3D illustrates a flowchart of a method for creating and displaying a timeline in accordance with some embodiments.

In an embodiment having multiple tabs 328, the data shown in table of display area 322 and histogram of display area 324 will only reflect data associated with a currently selected tab 328, while the timeline displayed in display area 326 will reflect data across all tabs 328. FIG. 3D illustrates a flowchart of a process for creating a timeline (for example, the timeline of display area 326 of FIG. 3C) in accordance with some embodiments. Timelines may be used when a user wishes to be able to identify subsets of events that are of interest, and inspect when the events happened in relation to each other.

At block 332, a plurality of raw data items are received. The received raw data items may be data items satisfying a search query associated with a data item lead, as described above. The received raw data items may include one or more raw data items that are of interest to a user, and one or more data items that may currently not be of interest to the user.

At optional block 334, the plurality of raw data items may be categorized. In some embodiments, categorization may be based upon one or more attributes of the data items (e.g., data items associated with a first device may be placed in a first category, while data items associated with a second device may be placed in a second category). In some embodiments, the categories may be defined by a user at a user interface. For example, a particular user may view the received data items, and designate certain data items as being "interesting," "suspicious," or otherwise deserving of further analysis. In some embodiments, one or more rules may be used to automatically categorize data items based at least in part upon one or more data item attributes. For example, data items corresponding to proxy requests to a particular domain may be automatically placed in a first category in accordance with one or more rules. In some embodiments, all received data items will be categorized, although in other embodiments, it is not necessary for all data items to receive a categorization.

At block 336, a time-based attribute of the raw data items is selected. As mentioned above, different data types may be associated with different time-based attributes. For example, a "proxy" data type may be associated with a "receive time" attribute, reflecting a time that a proxy request was received. In some embodiments, a data type may have multiple time-based attributes (e.g., a start time and an end time).

At block 338, a timeline is created based upon one or more selected time-based attributes and/or data item categories. For example, the timeline may include each of the time-based attributes selected by the user. In another example, the timeline may include events corresponding to data items marked by the user as being "suspicious." In some embodiments, the system may automatically select all time-based attributes associated with raw data items satisfying the query for display in the timeline. In some embodiments, if multiple data items correspond to events occurring within the same time period, the timeline may be displayed in the form of a bar chart or histogram (e.g., as shown in display area 326 in FIG. 3C), indicating a number of data items associated with each time period. By creating a timeline or histogram, the user may be able to quickly discern patterns, significant events, and/or shifts in distribution of the data items. For example, if the prevalence of a category of process running on the network increases dramatically over a particular time period, the user will be able to easily detect the change using the timeline/histogram. In some embodiments, multiple timelines based upon different categories may be constructed. The multiple timelines may be overlaid, differentiated using overlapping bars of different colors, and/or other types of visual indicators. This may be especially useful in cases where the user wishes to analyze correlations between occurrences of a particular category of data item and occurrences of a different category of data item.

Applying Enrichments

Figure 4A:
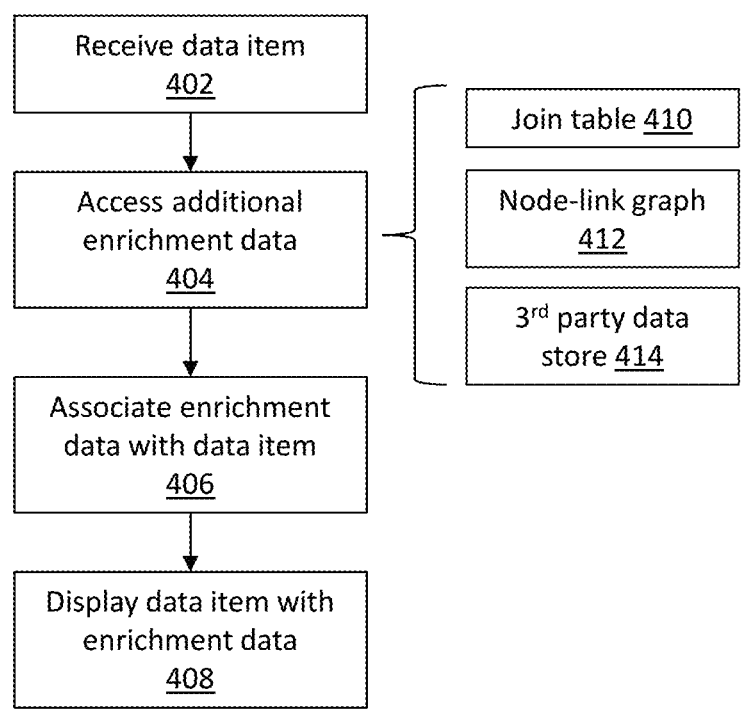
FIG. 4A illustrates a flowchart of performing data enrichment m accordance with some embodiments.

FIG. 4A illustrates a flowchart of a process for applying data enrichments to displayed raw data items, in accordance with some embodiments. At block 402, one or more data items to be enriched are received. The data items may comprise all raw data items currently being displayed to the user, raw data items satisfying one or more user-defined criteria, and/or raw data items specified by the particular enrichment to be applied. In addition, the enrichment may specify specific attributes or properties of the raw data items. For example, for raw data items corresponding to proxy requests from a monitored network to a particular domain, a user may desire to find out what other proxy requests originated from each source IP of the monitored network around the same time the requests to the particular domain were made (e.g., within 5 minutes). Thus, an enrichment configured to retrieve the additional proxy requests may specify the source IP and time attributes of the raw data items.

At block 404, one or more additional data sources containing the desired enrichment data are accessed. In some embodiments, the data source may comprise one or more data items stored as a table (block 410), such that the enrichment data may be retrieved by executing one or more table joins. In some embodiments, the data source may comprise data items stored as a data item-centric data model, a node-link graph, and/or other type of data model (block 412). In some embodiments, the additional data may be retrieved from a third party data source (block 414). For example, an API call may be used to access a third party application or data source containing the desired enrichment information. For example, data associated with particular raw data item(s) may be sent to a third party application (e.g., VirusTotal) in order to retrieve data (e.g., a rating indicating the presence of malware) related to the submitted raw data item(s).

At block 406, the additional data is retrieved from the data source and associated with the raw data items to be enriched. For example, in the above example of identifying proxy requests originating from the same source IP within a particular time period as proxy requests to a particular domain, the additional data may comprise a table containing proxy request data items, and proxy request data items that meet the criteria specified by the enrichment (e.g., occurring within 5 minutes of a proxy request to the particular domain on the same source IP) are associated with the original raw data items.

At block 408, the raw data items are displayed with the additional enrichment data. In some embodiments, the additional enrichment data may be displayed as one or more additional columns in the table containing the original raw data items. In some embodiments, the additional enrichment data may be displayed in a separate tab or table in the user interface.

Figure 4B:
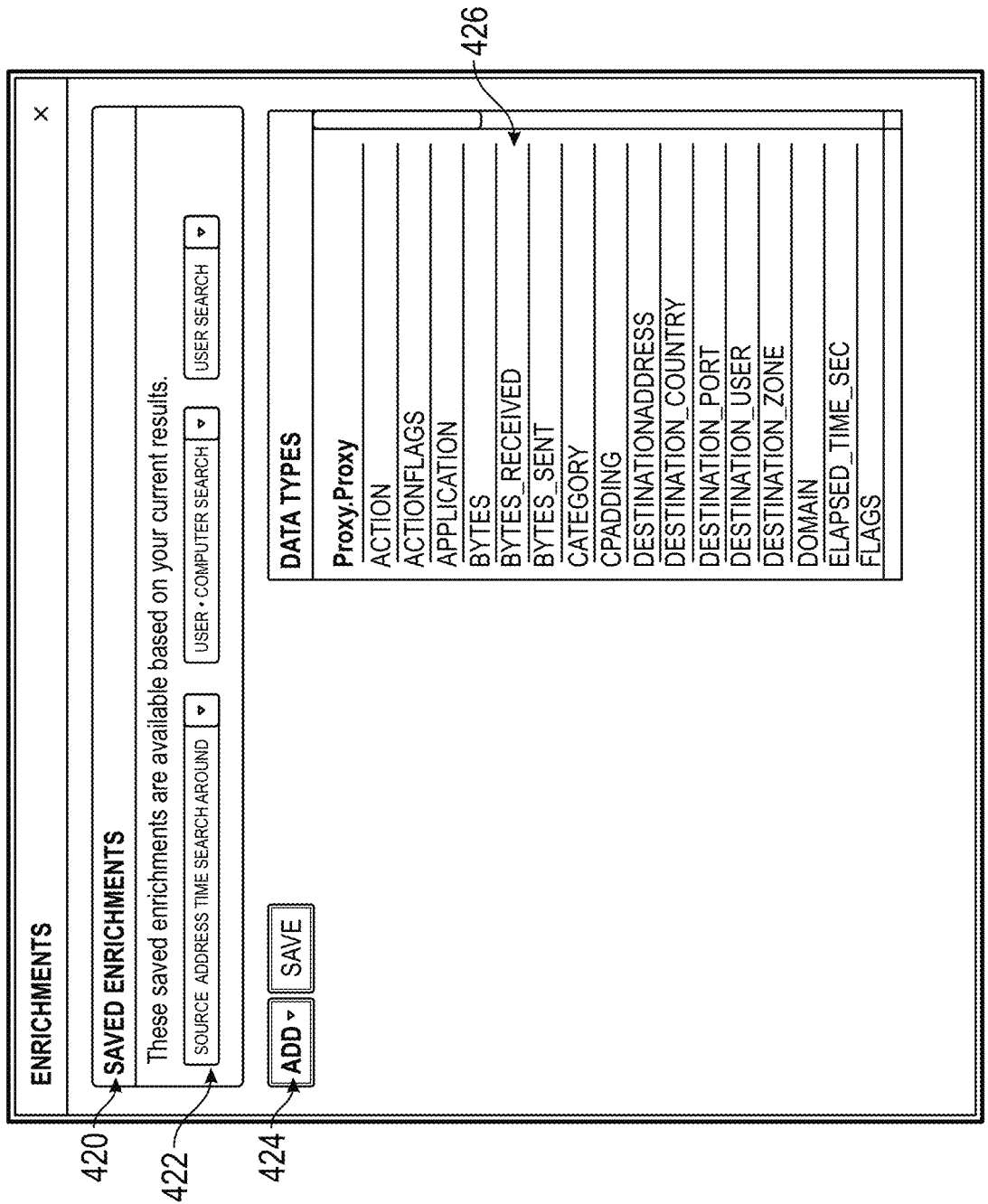

In some embodiments, a base set of enrichments may be provided to the user, which the user can then configure and customize. FIG. 4B illustrates an example interface for a user to configure enrichments and/or create new enrichments, in accordance with some embodiments. A plurality of existing enrichments 422 may be displayed to the user at 420. For example, in the illustrated figure, existing enrichments include a "source address time search around enrichment" (for a proxy request data item, search for other requests from the same source IP during a similar time period), a "user search" enrichment (identify a user associated with a proxy request data item), and a "user+computer search" enrichment (identify a user and computer associated with a proxy request data item). By clicking on the existing enrichments, a user is able to apply, configure, or modify the enrichment.

Figure 4C:
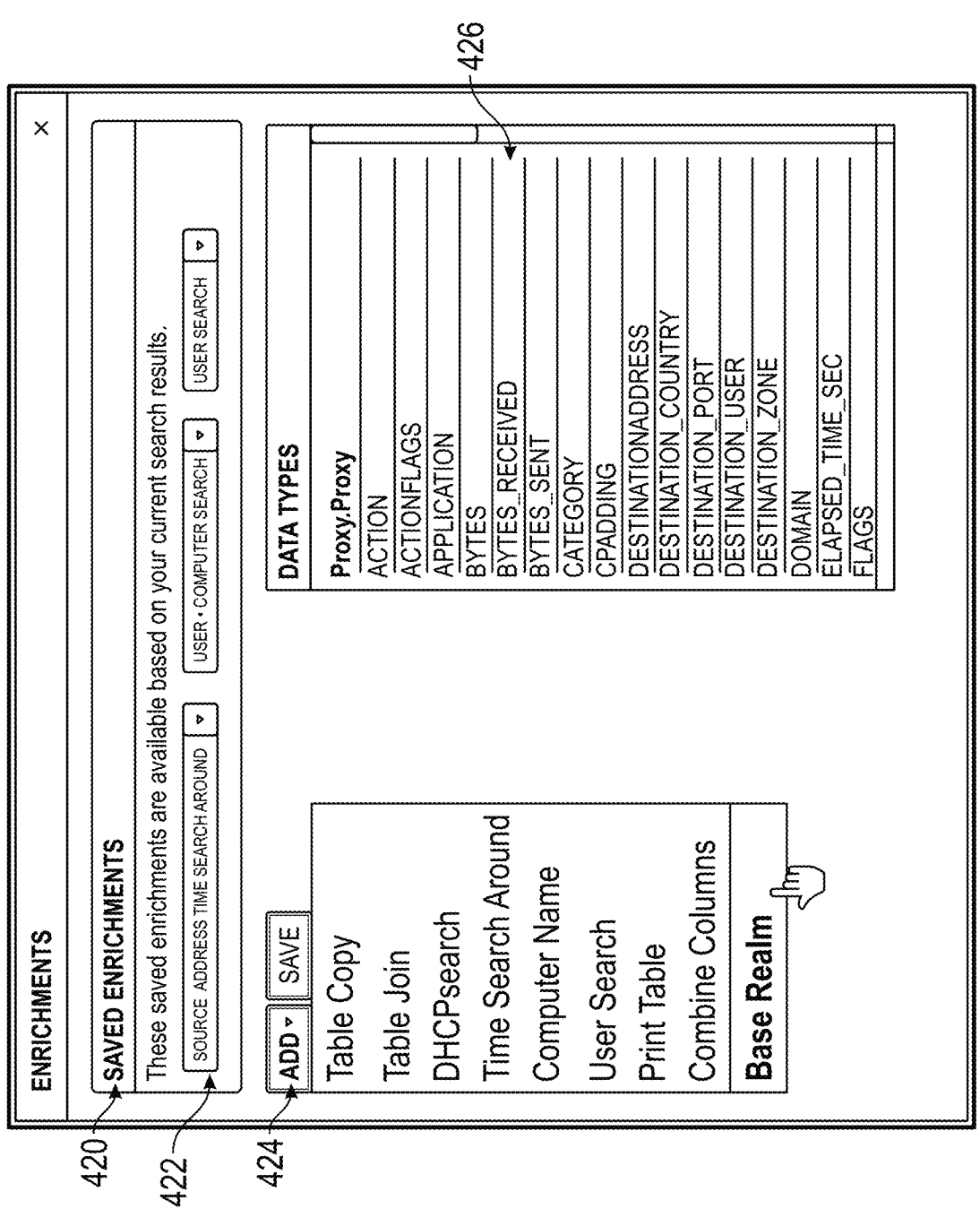

In addition, the interface may contain a control 424 that allows a user to add a new enrichment. In some embodiments, when a user clicks control 424 to add a new enrichment, one or more templates corresponding to common types of enrichments may be displayed (FIG. 4C). Clicking on a template may bring up an interface for the user to configure and customize a new enrichment (FIG. 4D). For example, the interface illustrated in FIG. 4D shows the user creating a new enrichment that examines the "Action" column of a Proxy table, and looks up an API call corresponding to the actions. The interface may also contain a control allowing the user to specify whether the enrichment data (e.g., API call) is to be displayed as additional columns in the same table as the enriched data items, or as a separate table or tab.

In some embodiments, the interface may display a list of available data types at display area 426, corresponding to data types associated with the properties of the data items. In some embodiments, the list of data types may be used to indicate to a user which data types have been used in configuring a particular enrichment. For example, as shown in FIG. 4D, the data types for "Proxy" and "Action" are greyed out, indicating that they are being used in the configuration of the current enrichment.

After a user has finished configuring the enrichment, the enrichment may be saved as a JSON or other type of plug-in in the backend. Saved enrichments will reference the data set that they apply to. For example, the enrichment illustrated as being configured by the user in FIG. 4D applies to a proxy data set. In some embodiments, when a user is view a set of data items from a particular data set, saved enrichments that reference that data set may appear in a drop-down menu or otherwise made available to the user, allowing the user to easily select and execute the enrichment.

Pre-Applying Enrichments to Searches

In some embodiments, a user, when performing a search, may wish to pre-apply one or more enrichments to the search, such that the results of the search are returned to the user with the enrichment data included, in a single step. For example, a user may wish to perform a search for all raw data items corresponding to proxy requests to a particular domain. In addition, the user may wish to know the names of the computers corresponding to the source IP addresses of the raw data items. Therefore, the user may wish to pre-apply an enrichment that looks up computer names for source IP addresses, such that when the search is executed, the computer names corresponding to the source IP addresses are automatically included with the search results.

Figure 5A:
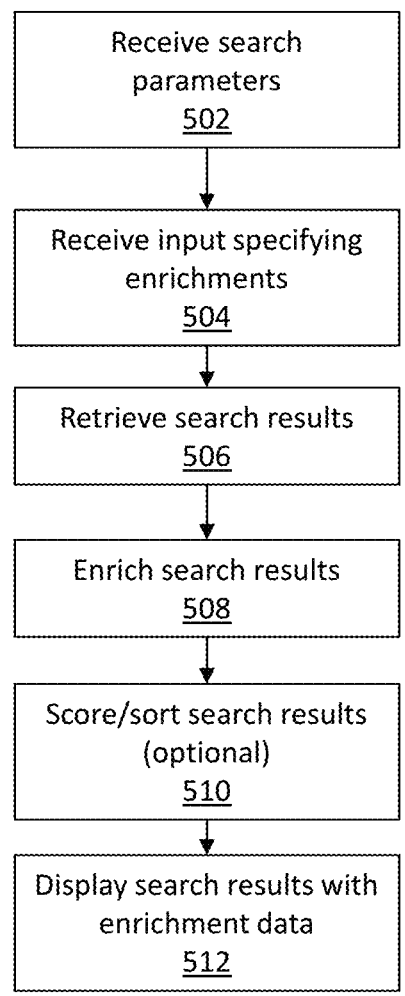
FIG. 5A illustrates a flowchart of a method for pre-applying enrichments to a search in accordance with some embodiments.
Figure 5B:
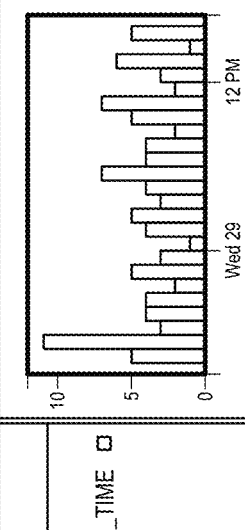
FIGS. 5B and 5C illustrate example interfaces for pre-applying enrichments to a search in accordance with some embodiments.
Figure 5C:
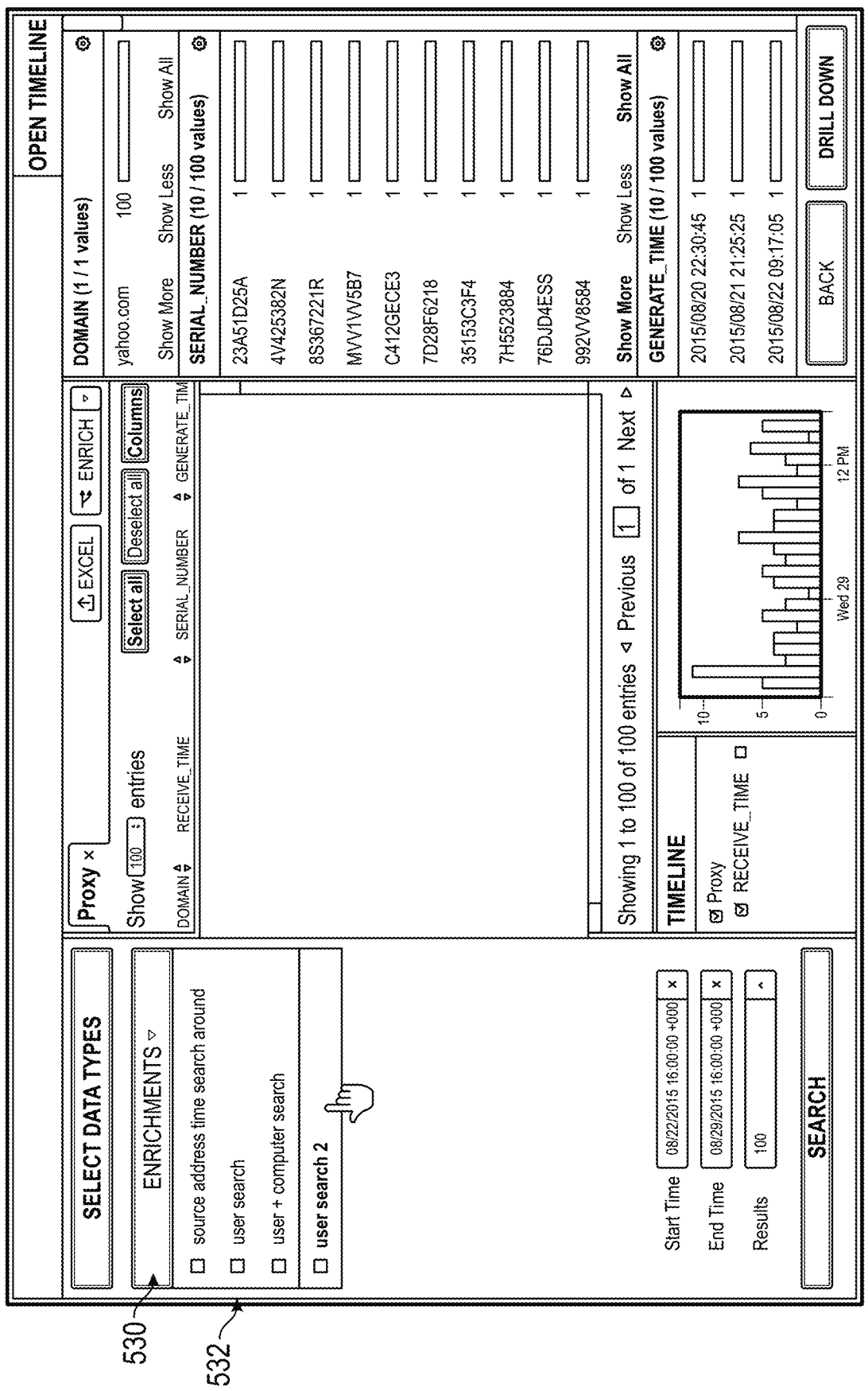

FIG. 5A illustrates a flowchart of an example process for pre-applying enrichments to searches. FIGS. 5B and 5C illustrate example interfaces wherein a user may perform a search with pre-applied enrichments.

At block 502, one or more search parameters are received from a user. For example, as illustrated in FIG. 5B at 520, a user may specify a search that searches for proxy requests directed to the "yahoo.com" domain that occurred within a specified time period.

At block 504, one or more inputs specifying enrichments to be applied to the search are received. For example, FIG. 5C illustrates a drop-down menu containing saved enrichments 532 that can be accessed by clicking on button 530. In some embodiments, different enrichments may be directed to different data sets. Enrichments that are not directed to the data set being searched may be grayed out, not displayed, or otherwise made unselectable by the user.

At block 506, search results corresponding to the search parameters are retrieved. At block 508, the retrieved search results are automatically enriched in accordance with the specified enrichments. In some embodiments, the data may be enriched using the method illustrated in FIG. 4A and described above.

In some embodiments, at block 510, the search results may optionally be scored and/or sorted, in accordance with any of the methods described above.

At block 512, the search results, comprising data items and enrichment data, are displayed to the user at a user interface. In some embodiments, wherein the data items are displayed in a tabular format (e.g., as illustrated in FIG. 3B), with rows corresponding to data items and columns corresponding to data item attributes, the enrichment data may be displayed as additional columns. Alternatively, the enrichment data may be displayed in a separate tab or table from the original data items. How the enrichment data is to be displayed may be based upon the format or type of enrichment data. For example, the enrichment data may be more suited to be displayed as additional columns if there is a one-to-one correlation between the original data items and enrichment data, while a separate tab or table may be more appropriate if there may be multiple pieces of enrichment data for each data item (or vice versa).

Data Item-Centric Data Model

To provide a framework for the description of specific systems and methods provided above and below, an example database system 1210 using an ontology 1205 will now be described in reference to FIGS. 6A-6C. This description is provided for the purpose of providing an example and is not intended to limit the techniques to the example data model, the example database system, or the example database system's use of an ontology to represent information.

In one embodiment, a body of data is conceptually structured according to data item-centric data model represented by ontology 1205. The conceptual data model is independent of any particular database used for durably storing one or more database(s) 1209 based on the ontology 1205. For example, each object of the conceptual data model may correspond to one or more rows in a relational database or an entry in Lightweight Directory Access Protocol (LDAP) database, or any combination of one or more databases.

Figure 6A:
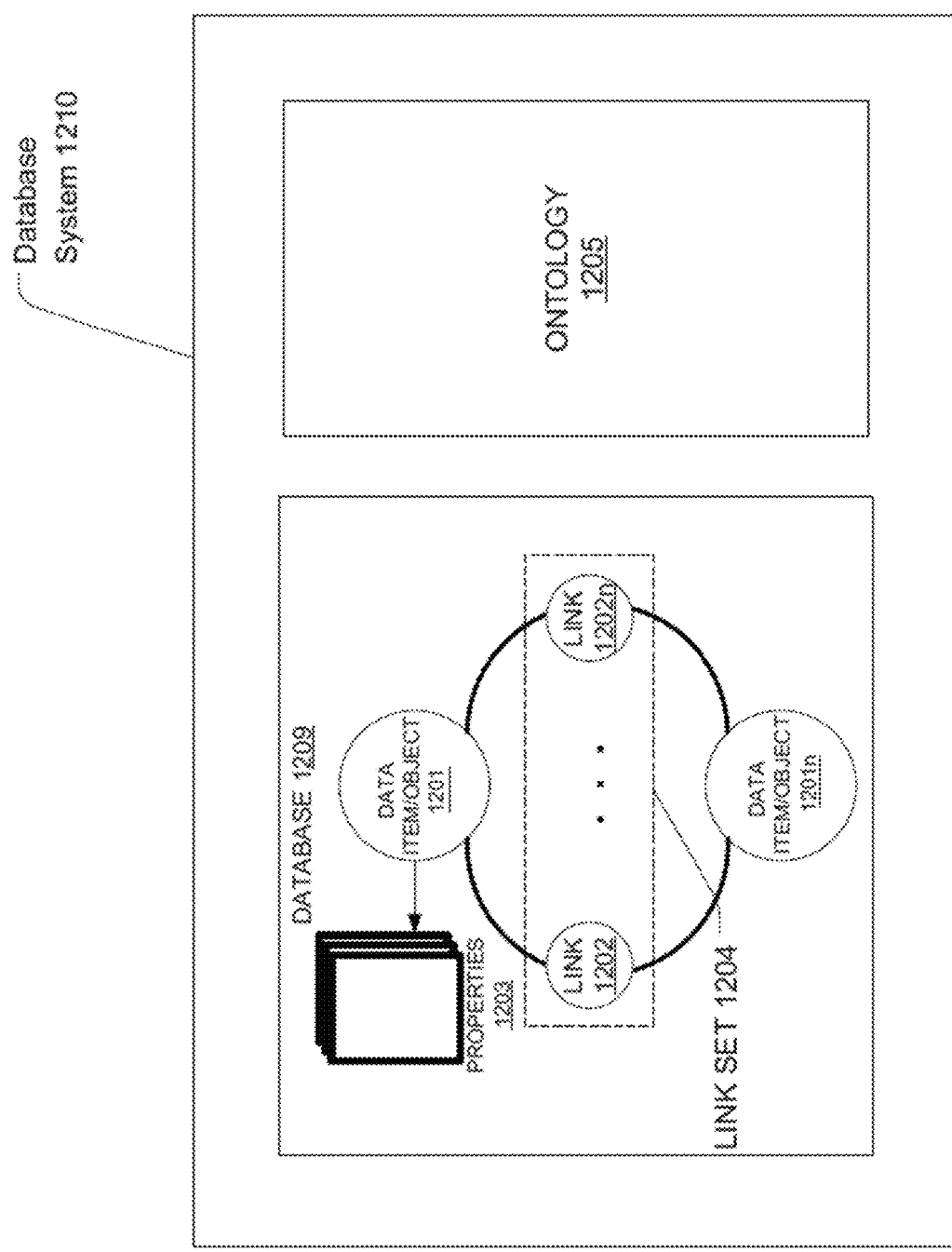
FIG. 6A illustrates an embodiment of a database system using an ontology.

FIG. 6A illustrates data item-centric conceptual data model (which may also be referred to as an "object-centric conceptual data model") according to an embodiment. An ontology 1205, as noted above, may include stored information providing a data model for storage of data in the database 1209. The ontology 1205 may be defined by one or more data item types (which may also be referred to as "object types"), which may each be associated with one or more property types. At the highest level of abstraction, data item 1201 (which may also be referred to as a "data object" or "object") is a container for information representing things in the world. For example, data item 1201 can represent an entity such as a person, a place, an organization, a market instrument, or other noun. Data item 1201 can represent an event that happens at a point in time or for a duration. Data item 1201 can represent a document or other unstructured data source such as a file (for example, a malware file), an email message, a news report, or a written paper or article. Each data item 1201 is associated with a unique identifier that uniquely identifies the data item within the database system.

Different types of data items may have different property types. For example, a "file" data item (as described above) may have various property types as described above (for example, various hash property types, associated file property types, various external analysis property types, and/or the like), a "Person" data item may have an "Eye Color" property type, and an "Event" data item may have a "Date" property type. Each property 1203 as represented by data in the database system 1210 may have a property type defined by the ontology 1205 used by the database 1205. Properties of data items may, in an embodiment, themselves be data items and/or associated with data items. For example, file data items may be associated with various analysis information items, as described above. Analysis information items may comprise data items and/or properties associated with data items (for example, file data items).

Items may be instantiated in the database 1209 in accordance with the corresponding data item definition for the particular data item in the ontology 1205. For example, a specific monetary payment (e.g., an item of type "event") of US$30.00 (e.g., a property of type "currency") taking place on Mar. 27, 2009 (e.g., a property of type "date") may be stored in the database 1209 as an event data item with associated currency and date properties as defined within the ontology 1205.

The data objects defined in the ontology 1205 may support property multiplicity. In particular, a data item 1201 may be allowed to have more than one property 1203 of the same property type. For example, a "Person" data item may have multiple "Address" properties or multiple "Name" properties.

Each link 1202 represents a connection between two data items 1201. In one embodiment, the connection is either through a relationship, an event, or through matching properties. A relationship connection may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Person" data items representing a brother and a sister, may both have an "Address" property that indicates where they live. If the brother and the sister live in the same home, then their "Address" properties likely contain similar, if not identical property values. In one embodiment, a link between two data items may be established based on similar or matching properties (e.g., property types and/or property values) of the data items. These are just some examples of the types of connections that may be represented by a link and other types of connections may be represented; embodiments are not limited to any particular types of connections between data items. For example, a document might contain references to two different items. For example, a document may contain a reference to a payment (one item), and a person (a second item). A link between these two items may represent a connection between these two entities through their co-occurrence within the same document.

Each data item 1201 may have multiple links with another data item 1201 to form a link set 1204. For example, two "Person" data items representing a husband and a wife could be linked through a "Spouse Of" relationship, a matching "Address" property, and one or more matching "Event" properties (e.g., a wedding). Each link 1202 as represented by data in a database may have a link type defined by the database ontology used by the database.

Figure 6B:
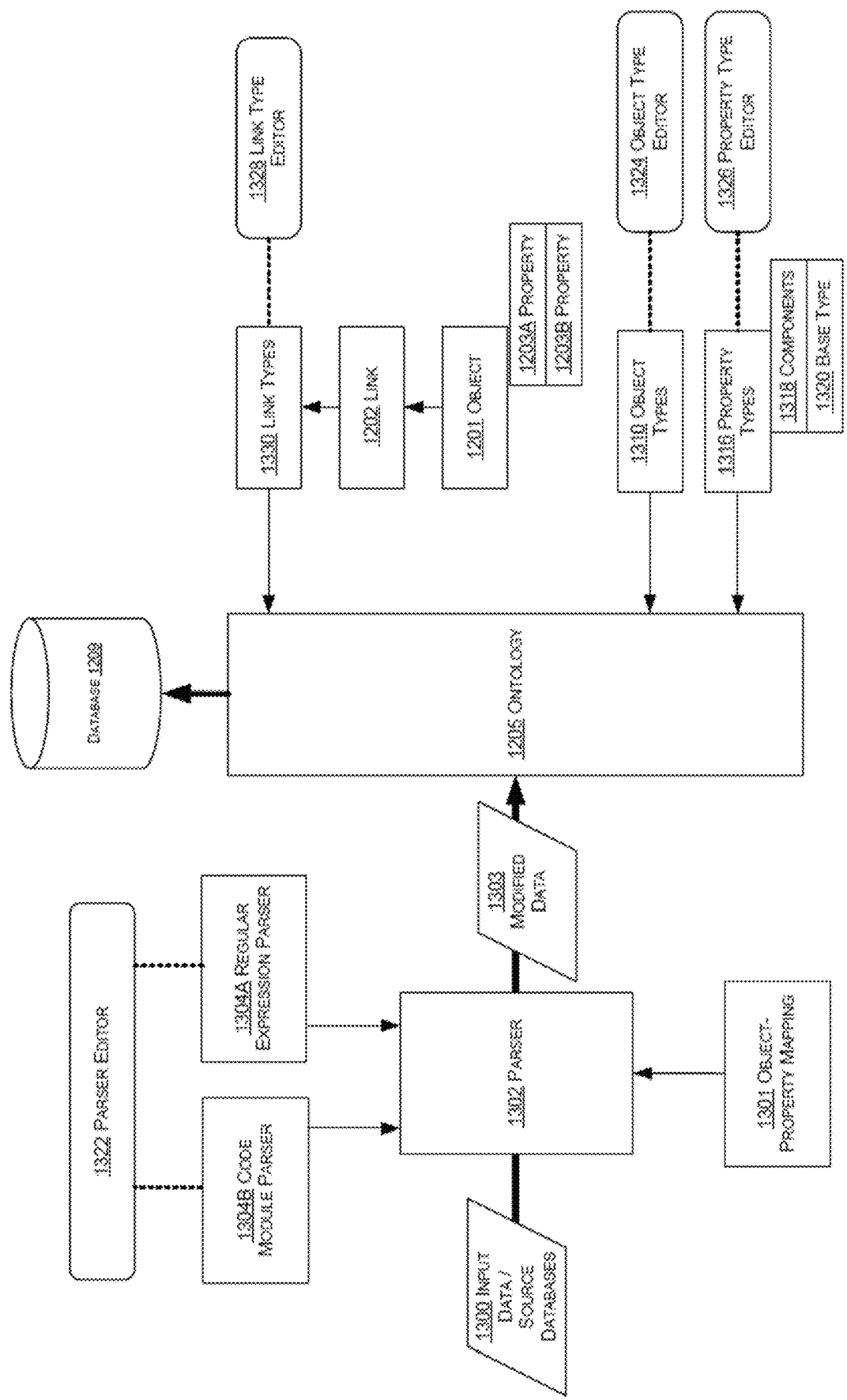
FIG. 6B illustrates an embodiment of a system for creating data in a data store using a dynamic ontology.

FIG. 6B is a block diagram illustrating example components and data that may be used in identifying and storing data according to an ontology. In this example, the ontology may be configured, and data in the data model populated, by a system of parsers and ontology configuration tools. In the embodiment of FIG. 6B, input data 1300 is provided to parser 1302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1302 is able to read a variety of source input data types and determine which type of data it is reading.

In accordance with the discussion above, the example ontology 1205 comprises stored information providing the data model of data stored in database 1209, and the ontology is defined by one or more data item types 1310, one or more property types 1316, and one or more link types 1330. Based on information determined by the parser 1302 or other mapping of source input information to item type, one or more data items 1201 may be instantiated in the database 209 based on respective determined item types 1310, and each of the items 1201 has one or more properties 1203 that are instantiated based on property types 1316. Two data items 1201 may be connected by one or more links 1202 that may be instantiated based on link types 1330. The property types 1316 each may comprise one or more data types 1318, such as a string, number, etc. Property types 1316 may be instantiated based on a base property type 1320. For example, a base property type 1320 may be "Locations" and a property type 1316 may be "Home."

In an embodiment, a user of the system uses an item type editor 1324 to create and/or modify the item types 1310 and define attributes of the item types. In an embodiment, a user of the system uses a property type editor 1326 to create and/or modify the property types 1316 and define attributes of the property types. In an embodiment, a user of the system uses link type editor 1328 to create the link types 1330. Alternatively, other programs, processes, or programmatic controls may be used to create link types and property types and define attributes, and using editors is not required.

In an embodiment, creating a property type 1316 using the property type editor 1326 involves defining at least one parser definition using a parser editor 1322. A parser definition comprises metadata that informs parser 1302 how to parse input data 1300 to determine whether values in the input data can be assigned to the property type 1316 that is associated with the parser definition. In an embodiment, each parser definition may comprise a regular expression parser 1304A or a code module parser 1304B. In other embodiments, other kinds of parser definitions may be provided using scripts or other programmatic elements. Once defined, both a regular expression parser 1304A and a code module parser 1304B can provide input to parser 1302 to control parsing of input data 1300.

Using the data types defined in the ontology, input data 1300 may be parsed by the parser 1302 determine which item type 1310 should receive data from a record created from the input data, and which property types 1316 should be assigned to data from individual field values in the input data. Based on the item/object-property mapping 1301, the parser 1302 selects one of the parser definitions that is associated with a property type in the input data. The parser parses an input data field using the selected parser definition, resulting in creating new or modified data 1303. The new or modified data 1303 is added to the database 1209 according to ontology 205 by storing values of the new or modified data in a property of the specified property type. As a result, input data 1300 having varying format or syntax can be created in database 1209. The ontology 1205 may be modified at any time using item/object type editor 1324, property type editor 1326, and link type editor 1328, or under program control without human use of an editor. Parser editor 1322 enables creating multiple parser definitions that can successfully parse input data 1300 having varying format or syntax and determine which property types should be used to transform input data 300 into new or modified input data 1303.

The properties, data items, and links (e.g. relationships) between the data items can be visualized using a graphical user interface ("GUI"). For example, FIG. 6C displays a user interface showing a graph representation 1403 of relationships (including relationships and/or links 1404, 1405, 1406, 1407, 1408, 1409, 1410, 1411, 1412, and 1413) between the data items (including data items 1421, 1422, 1423, 1424, 1425, 1426, 1427, 1428, and 1429) that are represented as nodes in the example of FIG. 6C. In this embodiment, the data items include person data items 1421, 1422, 1423, 1424, 1425, and 1426; a flight item 1427; a financial account 1428; and a computer data item 1429. In this example, each person node (associated with person data items), flight node (associated with flight data items), financial account node (associated with financial account data items), and computer node (associated with computer data items) may have relationships and/or links with any of the other nodes through, for example, other data items such as payment data items.

Figure 6C:
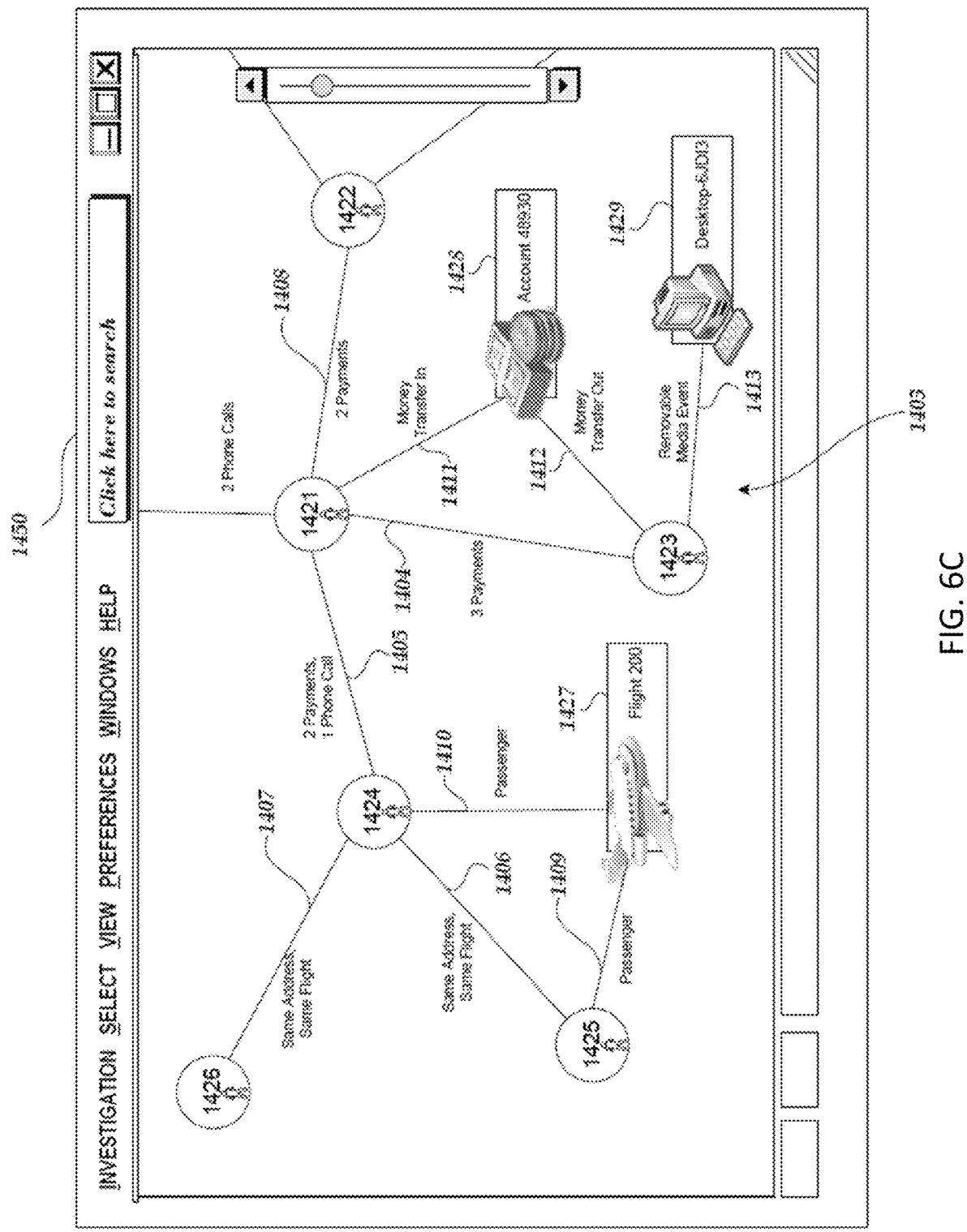
FIG. 6C illustrates a sample user interface using relationships described in a data store using a dynamic ontology.

For example, in FIG. 6C, relationship 1404 is based on a payment associated with the individuals indicated in person data items 1421 and 1423. The link 1404 represents these shared payments (for example, the individual associated with data item 1421 may have paid the individual associated with data item 1423 on three occasions). The relationship is further indicated by the common relationship between person data items 1421 and 1423 and financial account data item 1428. For example, link 1411 indicates that person data item 1421 transferred money into financial account data item 1428, while person data item 1423 transferred money out of financial account data item 1428. In another example, the relationships between person data items 1424 and 1425 and flight data item 1427 are indicated by links 1406, 1409, and 1410. In this example, person data items 1424 and 1425 have a common address and were passengers on the same flight data item 1427. In an embodiment, further details related to the relationships between the various items may be displayed. For example, links 1411 and 1412 may, in some embodiments, indicate the timing of the respective money transfers. In another example, the time of the flight associated with the flight data item 1427 may be shown.

Relationships between data items may be stored as links, or in some embodiments, as properties, where a relationship may be detected between the properties. In some cases, as stated above, the links may be directional. For example, a payment link may have a direction associated with the payment, where one person data item is a receiver of a payment, and another person data item is the payer of payment.

In various embodiments, data items may further include malware analysis metadata and/or links. Such malware analysis metadata may be accessed by the data analysis system for displaying objects and features on the user interface (as described above).

In addition to visually showing relationships between the data items, the user interface may allow various other manipulations. For example, the data items within database 1108 may be searched using a search interface 1450 (e.g., text string matching of data item properties), inspected (e.g., properties and associated data viewed), filtered (e.g., narrowing the universe of data items into sets and subsets by properties or relationships), and statistically aggregated (e.g., numerically summarized based on summarization criteria), among other operations and visualizations.

Implementation Mechanisms

According to an embodiment, the data analysis system and other methods and techniques described herein are implemented by one or more special-purpose computing devices. For example, the server computing system 110 and/or client computer system 130, as illustrated in FIG. 1, may be implemented as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
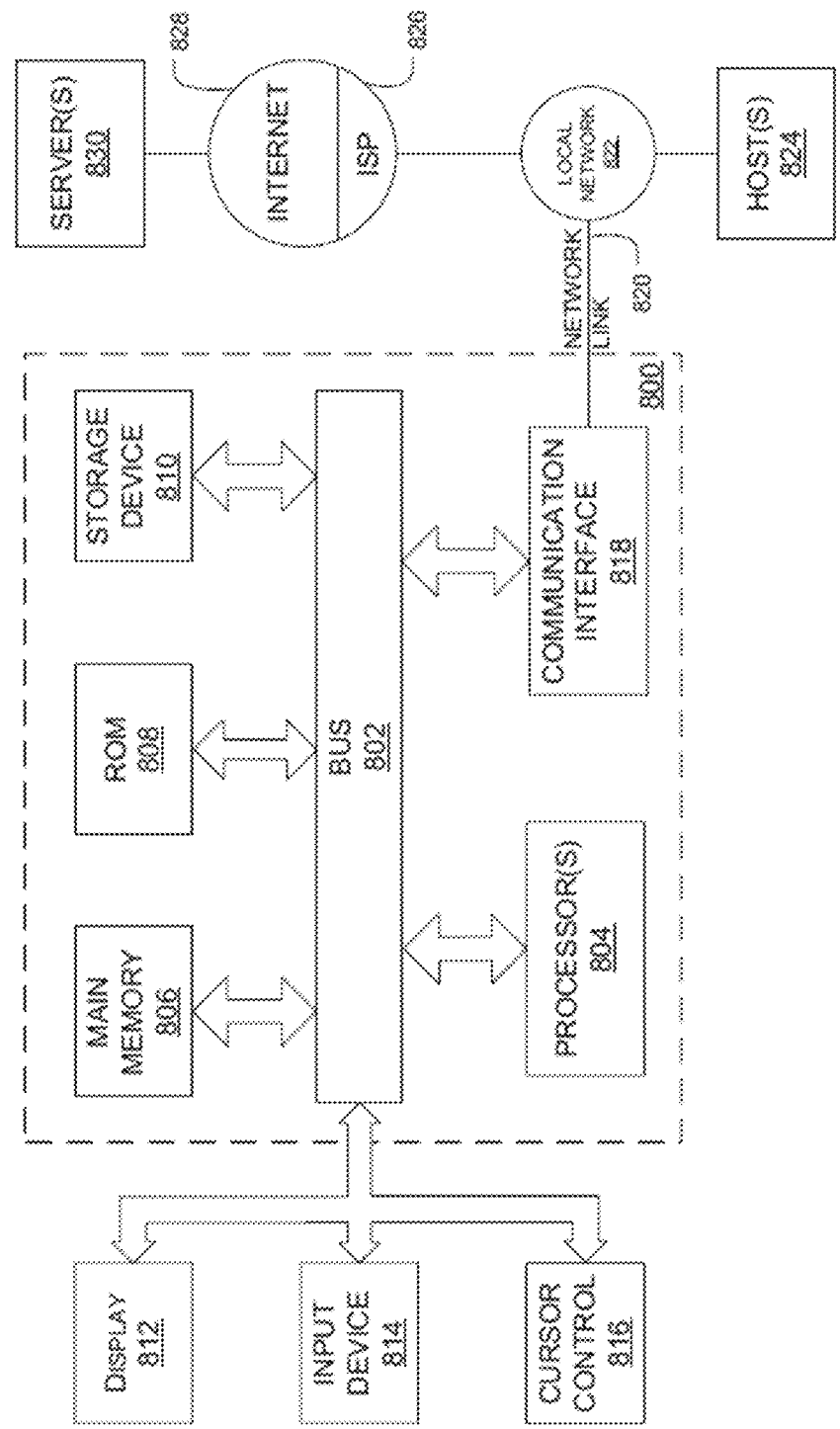
FIG. 7 illustrates a computer system with which certain methods discussed herein may be implemented.

For example, FIG. 7 is a block diagram that illustrates a computer system 800 upon which the various systems and methods discussed herein may be implemented. For example, in various embodiments, any of the computing systems illustrated in FIG. 1, such client computer system 130 and/or server computing system 110, may be implemented as computer systems 800 and/or servers 830 as illustrated in FIG. 7.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), and/or any other suitable data store, is provided and coupled to bus 802 for storing information (for example, file data items, analysis information data items, submission data items, and/or the like) and instructions.

Computer system 800 may be coupled via bus 802 to a display 812, such as a cathode ray tube (CRT), LCD display, or touch screen display, for displaying information to a computer user and/or receiving input from the user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module (e.g., a user interface engine 126 as illustrated in FIG. 1), and/or various other types of modules to implement one or more graphical user interface of the data analysis system, as described above. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. Generally, the modules described herein refer to logical modules that may be combined with other modules or divided into sub-modules despite their physical organization or storage. In various embodiments, aspects of the methods and systems described herein may be implemented by one or more hardware devices, for example, as logic circuits. In various embodiments, some aspects of the methods and systems described herein may be implemented as software instructions, while other may be implemented in hardware, in any combination.

As mentioned, computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media. In some embodiments, network 150 (as illustrated in FIG. 1) may correspond to a local network 822 and/or Internet 828.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. For example, in an embodiment various aspects of the data analysis system may be implemented on one or more of the servers 830 and may be transmitted to and from the computer system 800. For example, submitted malware data items may be transmitted to one of the servers 830, aspects of the basic analysis may be implemented on one or more of the servers 830, and/or aspects of the external analysis may be implemented on one or more of the servers 830. In an example, requests for external analyses of file data items may be transmitted to one or more third-party servers 830 (from, for example, the computer system 800 and/or another server 830 of the system), and analysis data may then be transmitted back from third-party servers 830.

In an embodiment, the data analysis system may be accessible by the user through a web-based viewer, such as a web browser. In this embodiment, the user interfaces of the system may be generated by a server (such as one of the servers 830) and/or the computer system 800 and transmitted to the web browser of the user. The user may then interact with the user interfaces through the web-browser. In an embodiment, the computer system 800 may comprise a mobile electronic device, such as a cell phone, smartphone, and/or tablet. The system may be accessible by the user through such a mobile electronic device, among other types of electronic devices.

Additional Embodiments

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being redefined herein to be restricted to including any specific characteristics of the features or aspects of the invention with which that terminology is associated. The scope of the invention should therefore be construed in accordance with the appended claims and any equivalents thereof

What is claimed is:

1. A computer system comprising:
   one or more computer readable storage devices configured to store:
      computer executable instructions; and
      data items, wherein a data item is associated with one or more attributes; and
   one or more hardware computer processors in communication with the one or more computer readable storage devices and configured to execute the computer executable instructions to cause the computer system to:
      identify a data item lead from the data items;
      receive one or more search parameters;
      query the data items based at least in part upon the received one or more search parameters;
      based at least in part on the query, access a first group of data items;
      generate a graphical user interface comprising:
         a plurality of tabs that are each associated with respective subsets of the first group of data items, wherein one of the plurality of tabs comprises a currently displayed tab;
         a table corresponding to the currently displayed tab, wherein the table includes, in a tabular format, at least a first portion of the first group of data items associated with the currently displayed tab and not others of the plurality of tabs; and
         a timeline corresponding to at least two of the plurality of tabs, wherein the timeline includes at least a second portion of the first group of data items organized based at least in part on a time-based attribute of the data items, wherein the data items included in the timeline are associated with at least two of the plurality of tabs;
      receive, via the graphical user interface, a user selection of at least a portion of the timeline corresponding to a selected time frame; and
      in response to receiving the user selection, update the table such that the table includes only data items of the first portion of the first group of data items corresponding to the selected time frame associated with the user selection, wherein the table includes a reduced set of data items based on the selected time frame and associated with the currently displayed tab and not others of the plurality of tabs.

2. The computer system of claim 1, wherein a data item of the data items corresponds to an occurrence of a process on a device on a monitored network.

3. The computer system of claim 1, wherein identifying a data item lead comprises:
   receiving the data items from at least one data source;
   analyzing or filtering the data items;
   enriching the data items;
   calculating scores for the data items; and
   identifying a data item lead of the data items based at least in part on the data item lead having a score satisfying a threshold.

4. The computer system of claim 3, wherein analyzing or filtering the data items comprises running the data items against a whitelist.

5. The computer system of claim 3, wherein enriching the data items comprises performing an external analysis on the data items using one or more third party analysis systems.

6. The computer system of claim 3, wherein enriching the data items comprises determining a frequency or distribution of an event associated with a data item of the data items.

7. The computer system of claim 1, wherein the computer executable instructions are configured to further cause the computer system to:
   perform an aggregation of data items of the first group of data items based at least in part upon an attribute value.

8. The computer system of claim 1, wherein the first group of data items comprises data items of two or more data types.

9. The computer system of claim 8, wherein the data items are separated into two or more tabs of the plurality of tabs based upon a type of the data items.

10. The computer system of claim 1, wherein the currently displayed tab, an indication of a plurality of tabs, the table, and the timeline are displayed in the graphical user interface simultaneously.

11. The computer system of claim 1, wherein the data items displayed in the timeline include the data items that are associated with a currently displayed tab.

12. The computer system of claim 1, wherein the data items displayed by the timeline include data items associated with all tabs of the two or more tabs.

13. The computer system of claim 1, wherein the second portion of the first group of data items includes the first portion of the first group of data items and additional data items.

14. A computer-implemented method comprising:
   by one or more hardware computer processors configured to execute computer executable instructions:
   identifying a data item lead from data items;
   receiving one or more search parameters;
   querying the data items based at least in part upon the received one or more search parameters;
   based at least in part on the querying, accessing a first group of data items;
   generating a graphical user interface comprising:
      a plurality of tabs that are each associated with respective subsets of the first group of data items, wherein one of the plurality of tabs comprises a currently displayed tab;
      a table corresponding to the currently displayed tab, wherein the table includes, in a tabular format, at least a first portion of the first group of data items associated with the currently displayed tab and not others of the plurality of tabs; and
      a timeline corresponding to at least two of the plurality of tabs, wherein the timeline includes at least a second portion of the first group of data items organized based at least in part on a time-based attribute of the data items, wherein the data items included in the timeline are associated with at least two of the plurality of tabs;
   receiving, via the graphical user interface, a user selection of at least a portion of the timeline corresponding to a selected time frame; and
   in response to receiving the user selection, updating the table such that the table includes only data items of the first portion of the first group of data items corresponding to the selected time frame associated with the user selection, wherein the table includes a reduced set of data items based on the selected time frame and associated with the currently displayed tab and not others of the plurality of tabs.

15. The computer-implemented method of claim 14, wherein the first group of data items comprises data items of two or more data types.

16. The computer-implemented method of claim 15, wherein the data items are separated into two or more tabs of the plurality of tabs based upon a type of the data items.

17. The computer-implemented method of claim 14, wherein the data items displayed in the timeline are associated with all tabs of the plurality of tabs.

18. The computer-implemented method of claim 14, wherein the data items displayed in the timeline include the data items that are associated with a currently displayed tab.

19. A non-transitory computer-readable storage medium including computer executable instructions that, when executed by a processor, cause the processor to:
   identify a data item lead from data items;
   receive one or more search parameters;
   query the data items based at least in part upon the received one or more search parameters;
   based at least in part on the query, access a first group of data items;
   generate a graphical user interface comprising:
      a plurality of tabs that are each associated with respective subsets of the first group of data items, wherein one of the plurality of tabs comprises a currently displayed tab;
      a table corresponding to the currently displayed tab, wherein the table includes, in a tabular format, at least a first portion of the first group of data items associated with the currently displayed tab and not others of the plurality of tabs; and
      a timeline corresponding to at least two of the plurality of tabs, wherein the timeline includes at least a second portion of the first group of data items organized based at least in part on a time-based attribute of the data items, wherein the data items included in the timeline are associated with at least two of the plurality of tabs;
   receive, via the graphical user interface, a user selection of at least a portion of the timeline corresponding to a selected time frame; and
   in response to receiving the user selection, update the table such that the table includes only data items of the first portion of the first group of data items corresponding to the selected time frame associated with the user selection, wherein the table includes a reduced set of data items based on the selected time frame and associated with the currently displayed tab and not others of the plurality of tabs.

20. The non-transitory computer-readable storage medium of claim 19, wherein the data items displayed in the timeline are associated with all tabs of the plurality of tabs.

\* \* \* \* \*